United States Patent
Sugiyama et al.

(10) Patent No.: US 6,314,945 B1
(45) Date of Patent: Nov. 13, 2001

(54) FUEL PUMP CONTROL APPARATUS

(75) Inventors: Masanori Sugiyama, Aichi-gun; Daichi Yamazaki, Toyota; Naoki Kurata, Nishikamo-gun, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/612,305

(22) Filed: Jul. 7, 2000

(30) Foreign Application Priority Data

Jul. 28, 1999 (JP) .................................................. 11-214216

(51) Int. Cl.⁷ .................................................. F02M 39/00
(52) U.S. Cl. ............................................ 123/506; 123/299
(58) Field of Search .................................... 123/299, 300, 123/506, 496, 446

(56) References Cited

U.S. PATENT DOCUMENTS

| | | | | |
|---|---|---|---|---|
| 4,530,337 | * | 7/1985 | Laufer | 123/506 |
| 4,782,803 | * | 11/1988 | Kikuchi | 123/300 |
| 5,070,848 | | 12/1991 | Mitsuyasu | 123/509 |
| 5,261,366 | * | 11/1993 | Regueiro | 123/299 |
| 5,271,366 | * | 12/1993 | Shimada et al. | 123/300 |

FOREIGN PATENT DOCUMENTS

| | | |
|---|---|---|
| (P) HEI 4-128518 | 4/1992 | (JP) . |
| (P) HEI 10-176618 | 6/1998 | (JP) . |
| (P) HEI 10-176619 | 6/1998 | (JP) . |

* cited by examiner

Primary Examiner—Thomas N. Moulis
(74) Attorney, Agent, or Firm—Oliff & Berridge, PLC

(57) ABSTRACT

During the idling state, the number of times of injecting fuel per performance of the fuel delivery from a high-pressure fuel pump is decreased or increased. If the number of times of injecting fuel per performance of the fuel delivery is decreased, the amount of fuel that needs to be delivered by one performance of the fuel delivery is reduced, so that the timing of starting to close an electromagnetic spill valve can be delayed. Therefore, the lift of a plunger for 1° rotation of a cam (i.e., cam speed) at the time of closure of the electromagnetic spill valve decreases, so that the force applied from fuel to the electromagnetic spill valve in the valve closing direction decreases. If the number of times of injecting fuel per performance of the fuel delivery is increased, the noises produced at the time of closure of the electromagnetic spill valve increase because the timing of starting to close the spill valve is advanced to increase the amount of fuel delivered by one performance of the fuel delivery. However, the number of times of closing the electromagnetic spill valve during a predetermined period decreases, so that the number of occurrences of the valve closure noises decreases.

13 Claims, 10 Drawing Sheets

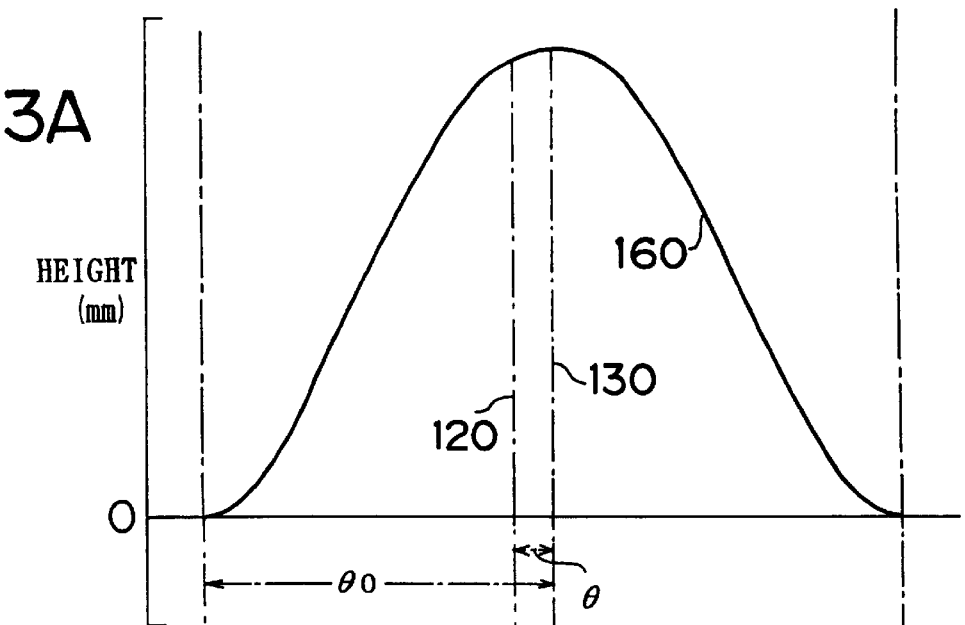
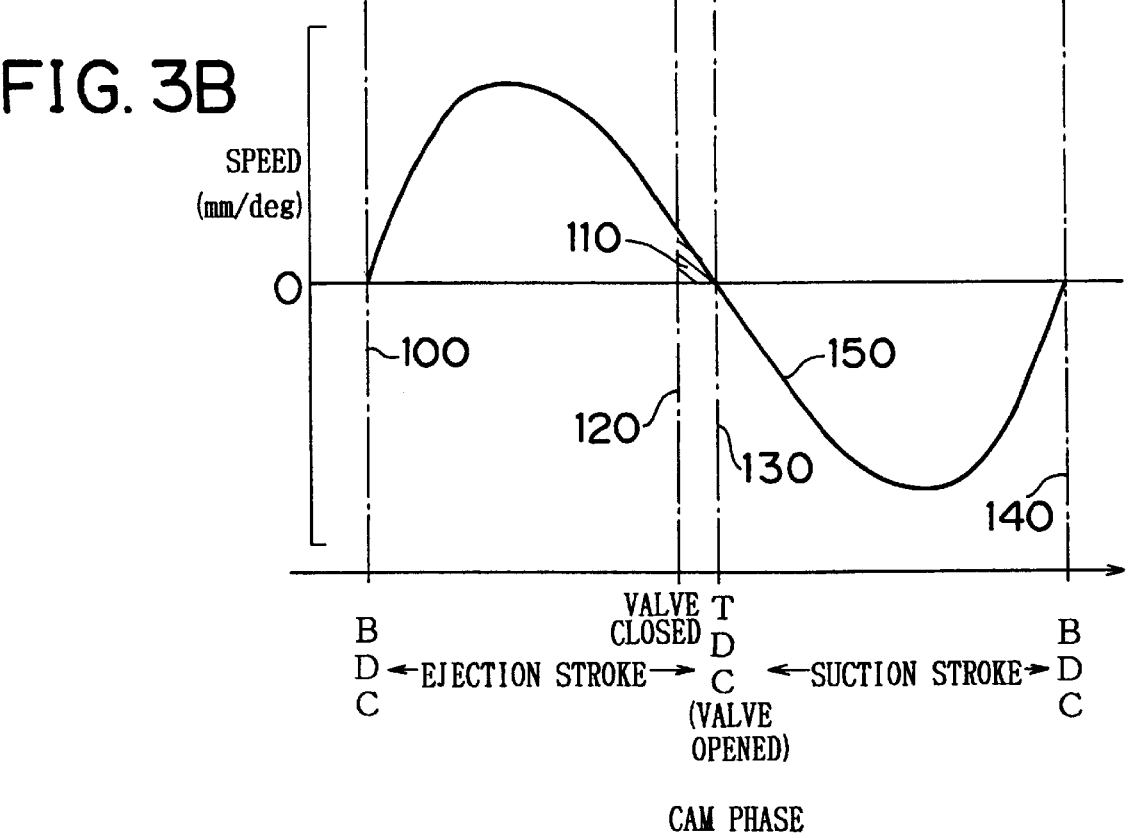

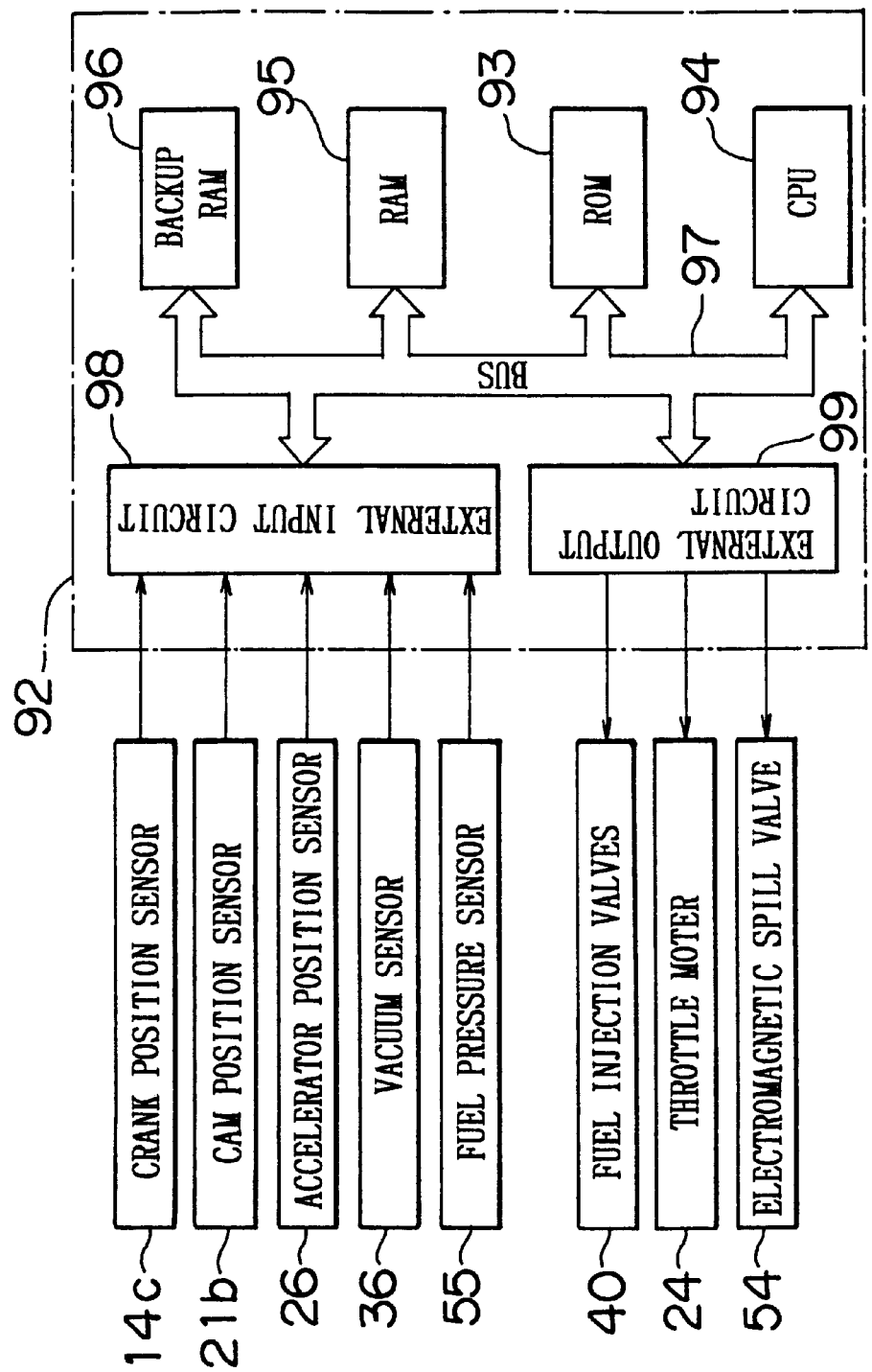

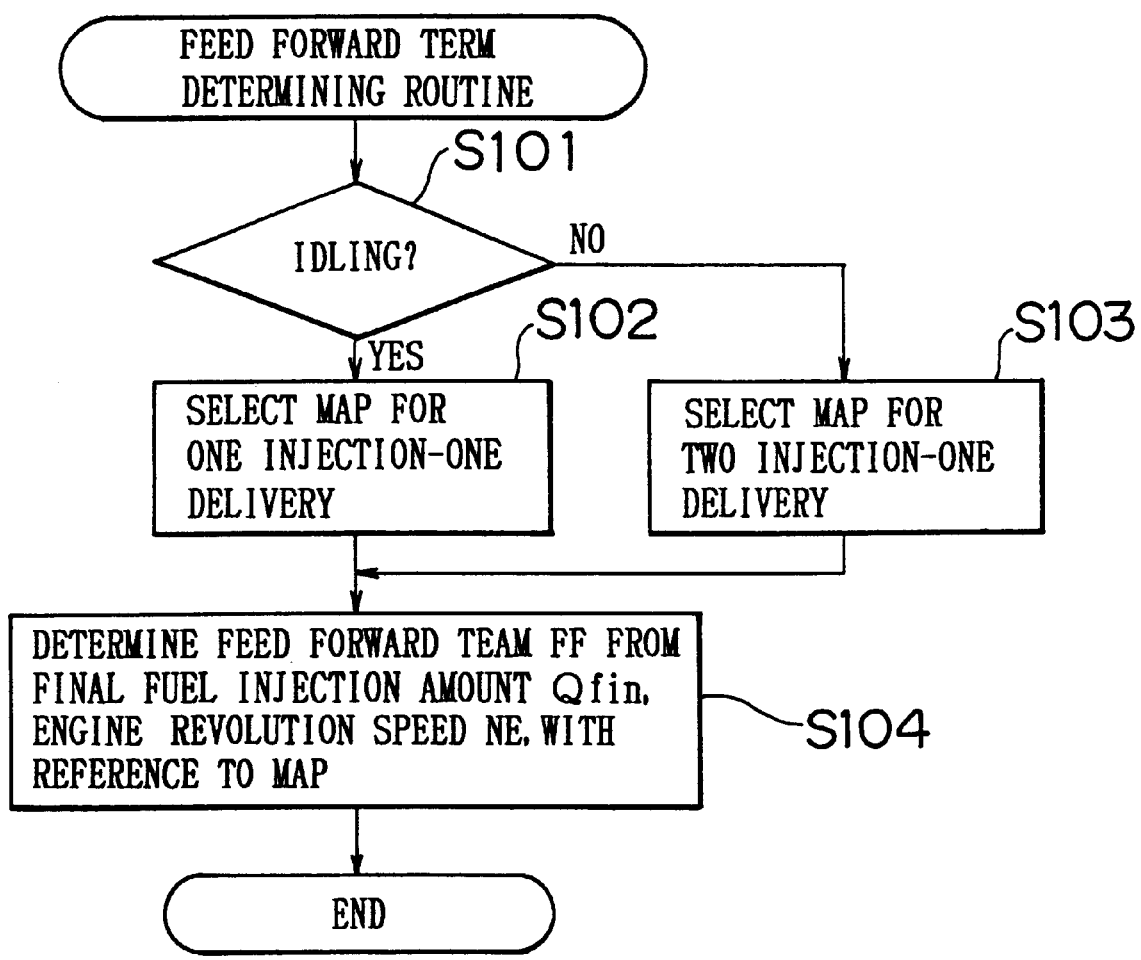

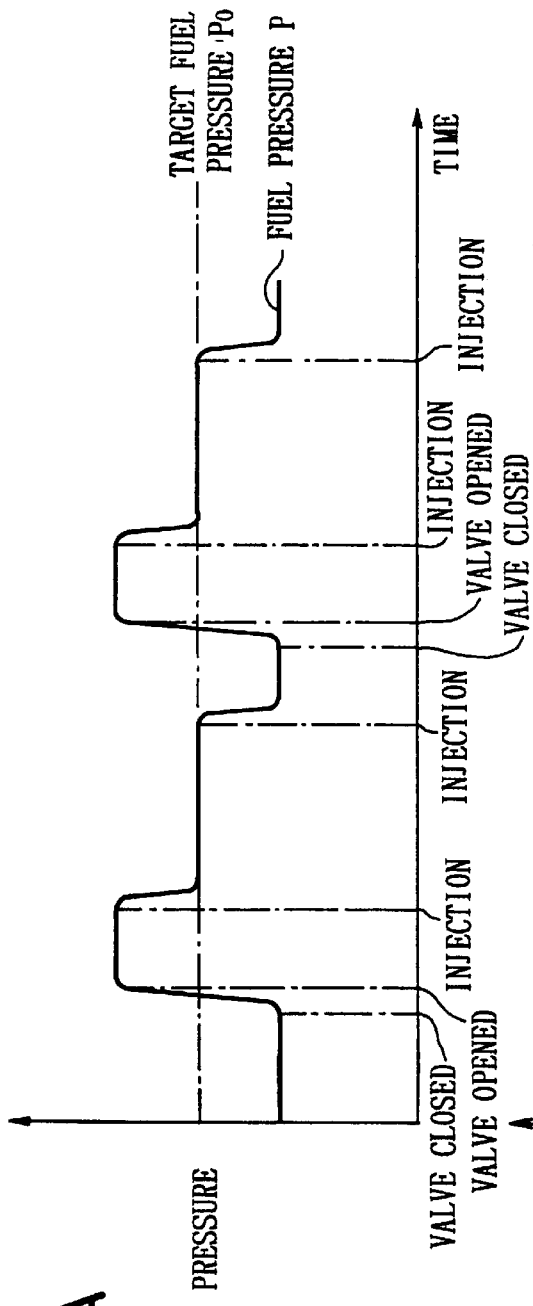
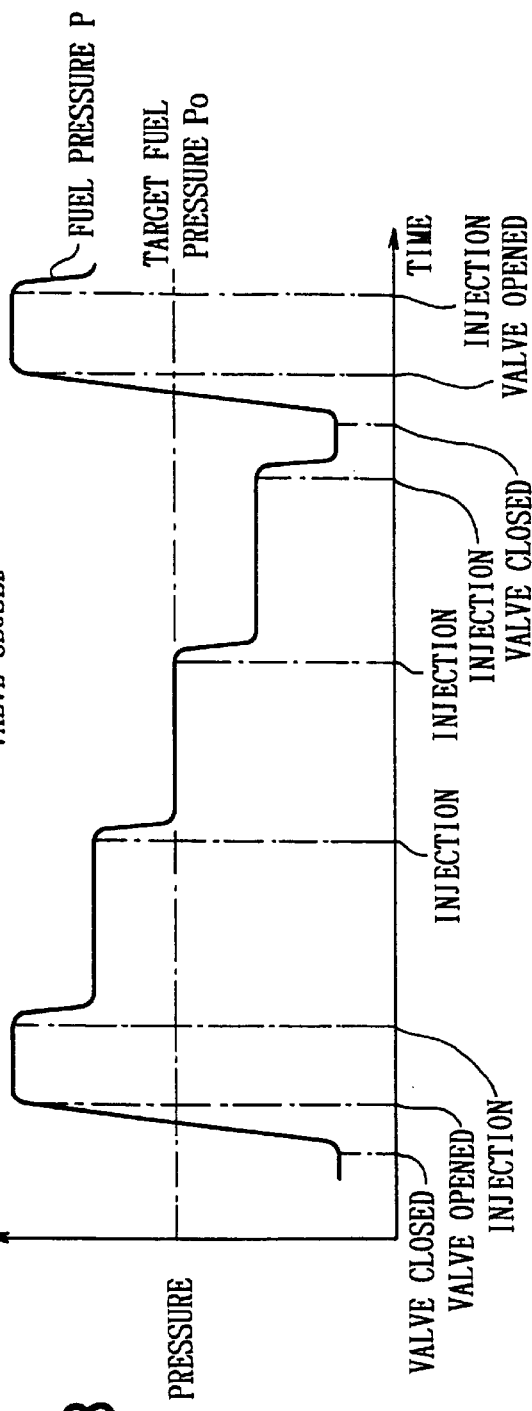
FIG. 9A
FIG. 9B

FUEL PUMP CONTROL APPARATUS

INCORPORATION BY REFERENCE

The disclosure of Japanese Patent Application No. 11-214216 filed on Jul. 28, 1999 including the specification, drawings and abstract is incorporated herein by reference in its entirety.

BACKGROUND OF THE INVENTION

1. Field of the Invention

The invention relates to a control apparatus for a fuel pump that pumps fuel toward a fuel injection valve of an internal combustion engine.

2. Description of Related Art

Recently, there have been commercialized internal combustion engines for motor vehicles and the like in which fuel is injected directly into combustion chambers to improve fuel economy, etc. In order to inject fuel from a fuel injection valve into a combustion chamber in such an engine despite a high pressure in the combustion chamber, it is necessary to provide a high fuel pressure in the fuel injection valve. In this type of engine, therefore, fuel pumped from a fuel tank by a feed pump is pressurized by a high-pressure fuel pump, and the thus pressurized fuel is delivered to the fuel injection valve. Such high-pressure fuel pumps are described in, for example, Japanese Patent Application Laid-Open Nos. 10-176618 and 10-176619. A construction of a high-pressure fuel pump as described in these laid-open patent applications and the like is shown in FIG. 10.

As shown in FIG. 10, a high-pressure fuel pump 101, as described in the laid-open patent applications and the like, has a plunger 103 reciprocated in a cylinder 102 by rotation of a cam 100, and a pressurizing chamber 104 defined by the cylinder 102 and the plunger 103. Connected to the pressurizing chamber 104 are a suction passage 107 connecting to a feed pump 106 for pumping fuel from a fuel tank 105, a spill passage 108 for leading fuel out of the pressurizing chamber 104 and returning fuel to the fuel tank 105, and a delivery passage 110 for delivering fuel from the pressurizing chamber 104 toward a fuel injection valve 109. The high-pressure fuel pump 101 has a spill valve 111 for establishing and discontinuing communication of the pressurizing chamber 104 with the suction passage 107 and the spill passage 108.

When the spill valve 111 is open and the plunger 103 is moving in such a direction as to increase the capacity of the pressurizing chamber 104 (downward in FIG. 10), that is, during the suction stroke of the high-pressure fuel pump 101, fuel is drawn from the suction passage 107 into the pressurizing chamber 104. When the spill valve is closed while the plunger 103 is moving in the pressurizing chamber capacity-reducing direction (upward in FIG. 10), that is, while the high-pressure fuel pump 101 is in the ejection stroke, the communication of the pressurizing chamber 104 with the suction passage 107 and the spill passage 108 is closed, so that fuel is pumped from the pressurizing chamber 104 toward the fuel injection valve 109 via the delivery passage 110.

Since the high-pressure fuel pump 101 delivers fuel toward the fuel injection valve 109 only when the spill valve 111 remains closed (closed valve period) during the ejection stroke, the amount of fuel delivered toward the fuel injection valve 109 can be adjusted by adjusting the closed valve period of the spill valve 111 through control of the timing of starting to close the spill valve 111. That is, the amount of fuel delivered is increased by elongating the closed valve period of the spill valve 111 through advancement of the timing of starting to close the spill valve 111, and the amount of fuel delivered is reduced by shortening the closed valve period of the spill valve 111 through delay of the timing of starting to close the spill valve 111.

Since the high-pressure fuel pump 101 pressurizes fuel delivered by the feed pump 106, and delivers pressurized fuel toward the fuel injection valve 109, the high-pressure fuel pump 101 allows precise fuel injection even in an internal combustion engine in which fuel is injected directly into a combustion chamber.

When the spill valve 111 is about to be closed during the ejection stroke of the high-pressure fuel pump 101, during which the capacity of the pressurizing chamber 104 reduces, fuel in the pressurizing chamber 104 tends to flow toward the spill passage 108 as well as toward the delivery passage 110. When the spill valve 111 is closed in this situation, the closing movement of the spill valve 111 is accelerated by fuel flowing as described above, so that the impact of closure of the spill valve 111 becomes considerably great. As the impact increases, the operational noise of the spill valve 111 (noise produced by closure of the valve) increases. The operational noise of the spill valve 111 repeatedly occurs every time the spill valve 111 closes.

During normal operation of an internal combustion engine, operational noises of the engine, such as noises caused by combustion of air-fuel mixture and the like, are loud, so that the operational noises of the spill valve 111 continually occurring corresponding to continual closures of the spill valve 111 are not so loud as to annoy an occupant in the vehicle or the like. However, when the engine operational noises become small, for example, during an idling operation of the engine or the like, the continual operational noises of the spill valve 111 become relatively great, so that the annoyance caused by the operational noises become louder than can be ignored.

SUMMARY OF THE INVENTION

Accordingly, it is an object of the invention to provide a fuel pump control apparatus capable of reducing operational noises produced every time the spill valve closes.

In accordance with the invention, a fuel pump control apparatus controls a fuel pump that draws fuel into a pressurizing chamber by changing a capacity of the pressurizing chamber based on a relative movement between a plunger and a cylinder caused by a rotation of a cam and that delivers fuel toward a fuel injection valve of an internal combustion engine, and includes a spill valve that opens and closes a communication between the pressurizing chamber and a spill passage that leads fuel out of the pressurizing chamber. The fuel pump control apparatus adjusts an amount of fuel delivered from the fuel pump toward the fuel injection valve by controlling a closed valve period of the spill valve. The fuel pump control apparatus of the invention includes a controller for adjusting a number of times of performing fuel delivery from the fuel pump during a predetermined period to change a number of times of injecting fuel from the fuel injection valve per performance of the fuel delivery, by controlling the spill valve based on a load of the internal combustion engine.

Normally, during an ejection stroke of a fuel pump, as the amount of relative movement between a plunger and a cylinder with respect to a predetermined angle rotation of a cam (hereinafter, referred to as "cam speed") increases, the force applied from fuel to a spill valve in the valve closing direction increases, so that the noise produced when the spill valve closes increases. When the position of the cam is near the top dead center during a movement of the cam from the bottom dead center to the top dead center, the cam speed decreases as the position of the cam approaches the top dead center. During an operation state of the engine during which the amount of fuel injected is relatively small, for example, during a low-load operation of the engine, the timing of starting to close the spill valve is set to a timing closer to the top dead center (i.e., a timing at which the cam speed is relatively low), so that the closed valve period of the spill valve is shortened. In this case, the noises caused by closures of the spill valve become lower than the noises caused by closures of the spill valve during a high-load operation state of the engine or the like. However, in this case, the operational noises of the engine, for example, combustion noises and the like, become further lower. Therefore, operational noises continually occurring corresponding to continual closures of the spill valve (valve closure noises) become relatively loud. However, in the invention, during a low-load operation state of the engine, during which the continual operational noises become relatively large in the conventional art, the number of times of injecting fuel performance of the fuel delivery from the high-pressure fuel pump is decreased or increased. If the number of times of injecting fuel per performance of the fuel delivery is decreased, the amount of fuel that needs to be delivered by one performance of the fuel delivery is reduced, so that the timing of starting to close the spill valve can be delayed. Therefore, the lift of the plunger for 10 rotation of a cam (i.e., cam speed) at the time of a closure of the spill valve decreases, so that the force applied from fuel to the spill valve in the valve closing direction decreases. If the number of times of injecting fuel per performance of the fuel delivery is increased, the noise produced at the time of a closure of the spill valve increases because the timing of starting to close the spill valve is advanced to increase the amount of fuel delivered by one performance of the fuel delivery. However, the number of times of closing the spill valve during a predetermined period decreases, so that the number of occurrences of valve closure noises decreases.

In the fuel pump control apparatus of the invention, the controller may decrease the number of times of injecting fuel per performance of the fuel delivery during a low-load operation of the internal combustion engine.

Therefore, during the low-load operation of the engine, during which the continual operational noises are likely to become relatively loud, the amount of fuel that needs to be delivered by one performance of the fuel delivery is reduced since the number of times of injecting fuel per performance of the fuel delivery is decreased. Therefore, the timing of starting to close the spill valve can be set to a timing even closer to the top dead center, so that the cam speed at the time of a closure of the spill valve can be further reduced. Hence, the noise produced by a closure of the spill valve can be further reduced. By reducing the noises produced by the spill valve in this manner, the noises continually occurring corresponding to continual closures of the spill valve are reduced.

Furthermore, the controller may decrease the number of times of injecting fuel per performance of the fuel delivery, at least when the internal combustion engine is in an idling state.

Therefore, during the idling state, during which the operational noises of the engine, such as combustion noises and the like, are quite low, the operational noises continually occurring corresponding to continual closures of the spill valve can be reduced, so that the continual operational noises of the spill valve can be precisely prevented from becoming loud relative to the operational noises of the engine.

In the fuel pump control apparatus of the invention, the controller may set the number of times of injecting fuel per performance of the fuel delivery to one during a low-load operation of the internal combustion engine.

Therefore, during the low-load operation of the engine, during which the continual operational noises are likely to become relatively loud, the amount of fuel that needs to be delivered by one performance of the fuel delivery from the fuel pump is reduced since the number of times of injecting fuel per performance of the fuel delivery is set to one. Therefore, the timing of starting to close the spill valve can be set to a timing even closer to the top dead center, so that the cam speed at the time of closure of the spill valve can be further reduced. Hence, the noise produced by a closure of the spill valve can be further reduced. By reducing the noises produced by the spill valve in this manner, the noises continually occurring corresponding to continual closures of the spill valve are reduced.

Furthermore, the controller may set the number of times of injecting fuel per performance of the fuel delivery to one, at least when the internal combustion engine is in an idling state.

Therefore, during the idling state, during which the operational noises of the engine, such as combustion noises and the like, are quite low, the operational noises continually occurring corresponding to continual closures of the spill valve can be reduced, so that the continual operational noises of the spill valve can be precisely prevented from becoming loud relative to the operational noises of the engine.

In the fuel pump control apparatus of the invention, the controller may increase the number of times of injecting fuel per performance of the fuel delivery during a low-load operation of the internal combustion engine.

Therefore, during the low-load operation of the engine, during which the continual operational noises are likely to become relatively loud, the number of times of performing the fuel delivery during a predetermined period of time is reduced and, therefore, the number of occurrences of noises produced by closure of the spill valve is reduced, since the number of times of injecting fuel from the fuel injection valve per performance of the fuel delivery from the fuel pump is increased. The amount of fuel delivered by one performance of the fuel delivery is increased, that is, the timing of starting to close the spill valve is advanced, so that the cam speed at the time of a closure of the spill valve increases. Therefore, the noise produced by the closure of the spill valve become loud. However, since the number of occurrences of the noises during a predetermined period is reduced, the noises continually occurring corresponding to continual closures of the spill valve are reduced.

Furthermore, the controller may increase the number of times of injecting fuel per performance of the fuel delivery, at least when the internal combustion engine is in an idling state.

Therefore, during the idling state, during which the operational noises of the engine, such as combustion noises and the like, are quite low, the operational noises continually occurring corresponding to continual closures of the spill valve can be reduced, so that the continual operational noises of the spill valve can be precisely prevented from becoming loud relative to the operational noises of the engine.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIGS. 3A and 3B are graphs indicating changes in the lift and the cam speed, respectively, with respect to changes of the phase of a cam that drives the high-pressure fuel pump;

FIG. 4 is a block diagram illustrating an electric construction of the control apparatus;

FIG. 7 is a flowchart illustrating a procedure of determining a feed forward term in the first embodiment;

FIGS. 9A and 9B time charts indicating changes in the fuel pressure P in the delivery pipe when fuel is delivered from the high-pressure pump and fuel is injected from the fuel injection valves in the second embodiment.

DETAILED DESCRIPTION OF PREFERRED EMBODIMENTS FIRST EMBODIMENT

A first exemplary embodiment in which the invention is applied to an in-line four-cylinder direct injection gasoline engine for a motor vehicle will be described with reference to FIGS. 1 to 7.

Figure 1:
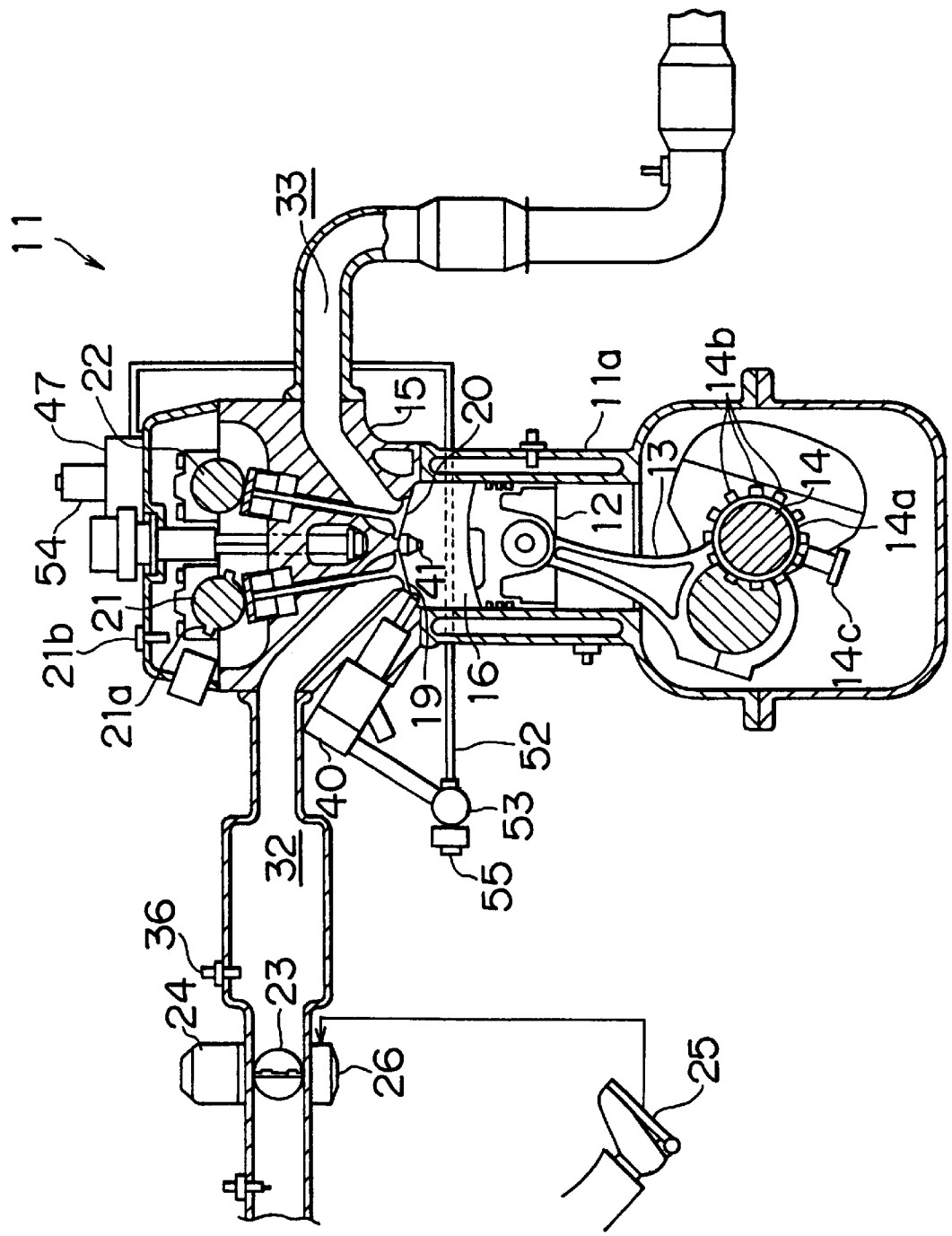
FIG. 1 is a sectional view of an engine to which a control apparatus for a high-pressure fuel pump according to a first embodiment is applied.

Referring to FIG. 1, an engine 11 has four pistons 12 (only one piston is shown in FIG. 1) that are provided for reciprocating movements in a cylinder block 11a. The pistons 12 are disposed in corresponding cylinders. The pistons 12 are connected to a crankshaft 14, that is, an output shaft of the engine 11, via connecting rods 13. Thus, reciprocating movements of the pistons 12 are converted into rotation of the crankshaft 14 by the connecting rods 13.

A signal rotor 14a is attached to the crankshaft 14. A plurality of protrusions 14b are arranged on an outer peripheral portion of the signal rotor 14a at intervals of equal angles about an axis of the crankshaft 14. A crank position sensor 14c is provided at a side of the signal rotor 14a. As the crankshaft 14 turns, the protrusions 14b of the signal rotor 14a sequentially pass by the crank position sensor 14c. Corresponding to each protrusion 14b passing by, the crank position sensor 14c outputs a pulse-form detection signal.

A cylinder head 15 is disposed on an upper end of the cylinder block 11a. A combustion chamber 16 is defined between the cylinder head 15 and each piston 12. Each combustion chamber 16 is connected to an intake passage 32 and an exhaust passage 33. The communication of each combustion chamber 16 with the intake passage 32 is opened and closed by opening and closing a corresponding one of intake valves 19. The communication of each combustion chamber 16 with the exhaust passage 33 is opened and closed by opening and closing a corresponding one of exhaust valves 20.

The cylinder head 15 rotatably supports an intake camshaft 21 and an exhaust camshaft 22 for driving the intake valves 19 and the exhaust valves 20 in the opening and closing directions. The intake camshaft 21 and the exhaust camshaft 22 are connected to the crankshaft 14 via a timing belt (not shown), gears (not shown), and the like, so that rotation is transmitted from the crankshaft 14 to the camshafts 21, 22 via the belt, the gears and the like. Rotation of the intake camshaft 21 causes the intake valves 19 to open and close, and rotation of the exhaust camshaft 22 causes the exhaust valves 20 to open and close.

A cam position sensor 21b is provided at a side of the intake camshaft 21 on the cylinder head 15. The cam position sensor 21b detects protrusions 21a provided on an outer peripheral surface of the intake camshaft 21, and correspondingly outputs detection signals. As the intake camshaft 21 rotates, the protrusions 21a of the intake camshaft 21 pass by the cam position sensor 21b. Corresponding to the passage of the protrusions 21a, the cam position sensor 21b outputs detection signals at predetermined intervals.

A throttle valve 23 for adjusting the amount of air taken into the engine 11 is provided in an upstream portion of the intake passage 32. The degree of opening of the throttle valve 23 is adjusted by controlling the driving of a throttle motor 24 based on the amount of depression of an accelerator pedal 25 (accelerator operation amount) detected by an accelerator pedal position sensor 26. Through the adjustment of the opening of the throttle valve 23, the amount of air taken into the engine 11 is adjusted. A vacuum sensor 36 for detecting the pressure in the intake passage 32 is provided in a portion of the intake passage 32 downstream of the throttle valve 23. The vacuum sensor 36 outputs a detection signal corresponding to the detected pressure in the intake passage 32.

The cylinder head 15 is also provided with fuel injection valves 40 that inject fuel into the corresponding combustion chambers 16 and ignition plugs 41 that ignite air-fuel mixture charged in the corresponding combustion chambers 16. When fuel is injected from a fuel injection valve 40 into the corresponding combustion chamber 16, injected fuel mixes with air drawn into the combustion chamber 16 via the intake passage 32, thereby forming a mixture of fuel and air within the combustion chamber 16. The air-fuel mixture in the combustion chamber 16 combusts upon ignition by the corresponding ignition plug 41. After the combustion, resultant gas is ejected into the exhaust passage 33.

In the engine 11, the combustion mode is changed between a stratified charge combustion mode and a uniform combustion mode in accordance with the state of operation of the engine 11. When the operation of the engine 11 is in a high-speed and high-load region in which high power is required, the uniform combustion mode is entered. In the uniform combustion mode, fuel is injected into each combustion chamber 16 during the intake stroke to form a uniformly mixed air-fuel mixture, and the combustion of the uniform mixture produces a high power. When the operation of the engine 11 is in a low-load and low-speed region in which high power is not required, the stratified charge combustion mode is entered. In the stratified charge combustion mode, fuel is injected into each combustion chamber 16 during the compression stroke to provide a fuel-rich mixture in the vicinity of the ignition plug 41, so that good ignition can be achieved even though the average air-fuel ratio of the entire amount of mixture in each combustion chamber 16 is a considerably fuel-lean ratio, that is, a ratio considerably higher than the theoretical air-fuel ratio.

In order to achieve an air-fuel ratio of mixture that is on the fuel-lean side of the theoretical air-fuel ratio during the stratified charge combustion mode, the degree of opening of the throttle valve 23 is set to a greater value (toward the open end) than during the uniform combustion mode. Therefore, the pumping loss of the engine 11 decreases, and the fuel economy improves during the stratified charge combustion mode. Thus, by changing the combustion mode in accordance with the state of operation of the engine, it is possible to produce a necessary engine output and improve the fuel economy.

In the direct injection type engine 11 described above, the pressure of fuel supplied to the fuel injection valves 40 is set relatively high in order to inject fuel into the combustion chambers 16 overcoming the high pressure in the combustion chambers 16. The construction of a fuel-supplying apparatus of the engine 11 for supplying high-pressure fuel to the fuel injection valves 40 will be described in detail with reference to FIG. 2.

Figure 2:
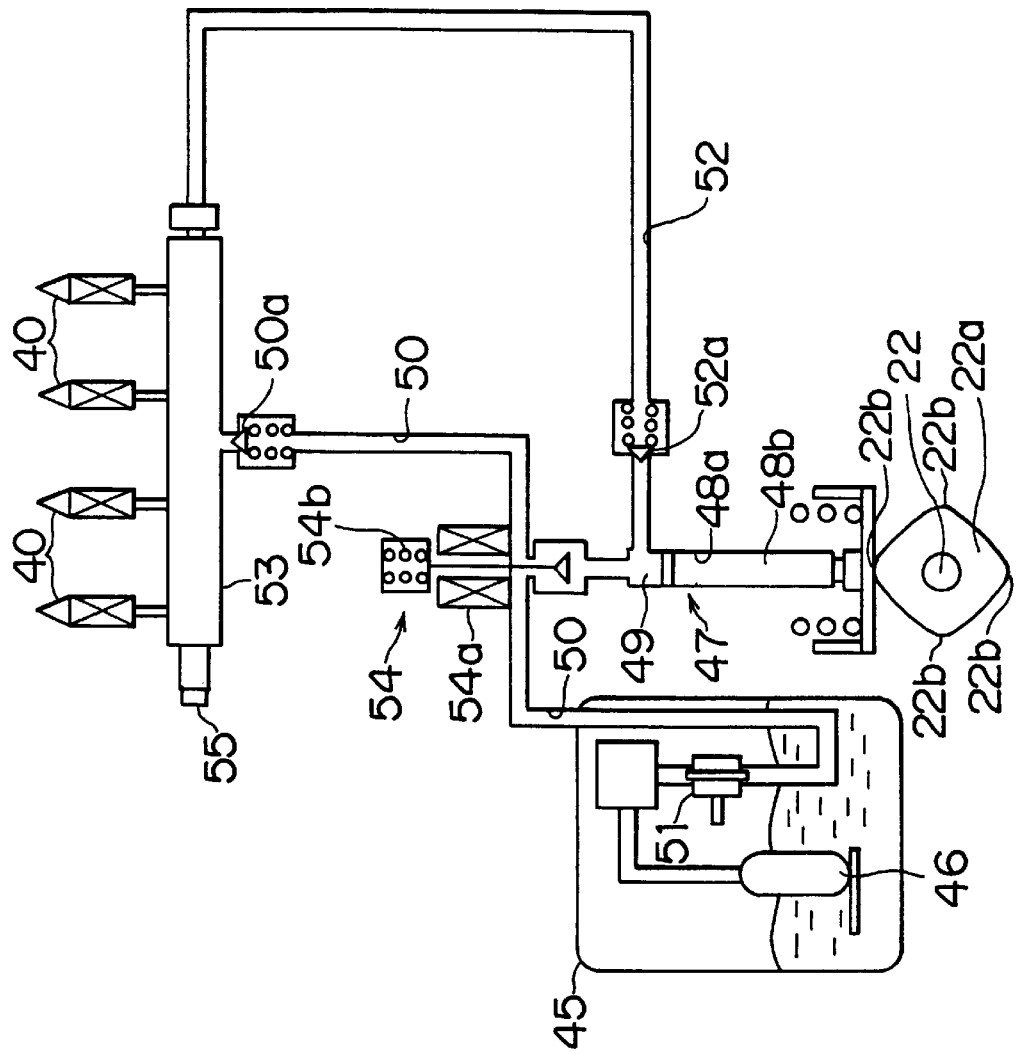
FIG. 2 is a schematic illustration of an exemplary fuel-supplying apparatus of the engine shown in FIG. 1.

As shown in FIG. 2, the fuel-supplying apparatus of the engine 11 has a feed pump 46 that pumps fuel from a fuel tank 45, and a high-pressure fuel pump 47 that pressurizes fuel fed by the feed pump 46 and delivers pressurized fuel toward the fuel injection valves 40. The pressure of fuel supplied by the feed pump 46 is set to, for example, 0.3 MPa, in this embodiment. The high-pressure fuel pump 47 has a plunger 48b that is reciprocated within a cylinder 48a based on rotation of a cam 22a attached to the exhaust camshaft 22. The cam 22a has four cam lobes 22b that are arranged equiangularly about an axis of the exhaust camshaft 22. As the exhaust camshaft 22 rotates, the plunger 48b is reciprocated in the cylinder 48a in accordance with the cam lobes 22b.

The exhaust camshaft 22 undergoes one rotation (360°) during every two rotations (720°) of the crankshaft 14. The plunger 48b reciprocates four times during every one rotation of the exhaust camshaft 22. During every 720° rotation of the crank shaft 14, fuel injection from fuel injection valves 40 into the corresponding combustion chambers 16 of the engine 11 is performed four times. Therefore, in the engine 11, fuel injection is performed once for every one reciprocation of the plunger 48b in the high-pressure fuel pump 47.

The high-pressure fuel pump 47 has a pressurizing chamber 49 that is defined by the cylinder 48a and the plunger 48b and that changes in capacity in accordance with the reciprocating movements of the plunger 48b. The pressurizing chamber 49 is connected to the feed pump 46 via a low-pressure fuel passage 50. The low-pressure fuel passage 50 has in its part way a pressure regulator 51 for maintaining a constant pressure (0.3 MPa) in the low-pressure fuel passage 50. The pressurizing chamber 49 communicates with a delivery pipe 53 via a high-pressure fuel passage 52 and a check valve 52a. The fuel injection valves 40 corresponding to the individual cylinders of the engine 11 are connected to the delivery pipe 53.

The delivery pipe 53 is provided with a fuel pressure sensor 55 for detecting the pressure of fuel (fuel pressure) in the delivery pipe 53. The delivery pipe 53 communicates with the low-pressure fuel passage 50 via a check valve 50a.

When the fuel pressure detected by the fuel pressure sensor 55 becomes excessively high, the check valve 50a opens to allow fuel to flow from the delivery pipe 53 to the low-pressure fuel passage 50. The pressure in the low-pressure fuel passage 50, into which fuel flows from the delivery pipe 53, is maintained at the constant pressure (0.3 MPa) by the pressure regulator 51. Therefore, the check valve 50a and the pressure regulator 51 prevent the pressure in the delivery pipe 53 from excessively increasing.

The high-pressure fuel pump 47 is provided with an electromagnetic spill valve 54 that opens and closes the communication between the low-pressure fuel passage 50 and the pressurizing chamber 49. The electromagnetic spill valve 54 has an electromagnetic solenoid 54a. The electromagnetic spill valve 54 is opened and closed by controlling the voltage applied to the electromagnetic solenoid 54a. That is, when electrification of the electromagnetic solenoid 54a is stopped, the electromagnetic spill valve 54 opens, overcoming force from a coil spring 54b, to establish a state in which the pressurizing chamber 49 is connected in communication to the low-pressure fuel passage 50.

When the plunger 48b is moved in such a direction as to expand the capacity of the pressurizing chamber 49 during the above-described state of the electromagnetic spill valve 54, that is, when the high-pressure fuel pump 47 undergoes the suction stroke, fuel pumped out from the feed pump 46 is drawn into the pressurizing chamber 49 via the low-pressure fuel passage 50. Then, while the plunger 48b is moved in the pressurizing chamber-capacity reducing direction, that is, during the ejection stroke of the high-pressure fuel pump 47, the electromagnetic solenoid 54a is electrified so that the electromagnetic spill valve 54 closes, overcoming force from the coil spring 54b, so that the communication between the low-pressure fuel passage 50 and the pressurizing chamber 49 is closed. Upon the closure, fuel is delivered from the pressurizing chamber 49 toward the fuel injection valves 40. In this manner, the high-pressure fuel pump 47 pressurizes fuel supplied by the feed pump 46, to a high pressure f for example, 12 MPa. Since fuel pressurized in this manner is delivered to the fuel injection valves 40 via the high-pressure fuel passage 52 and the delivery pipe 53, fuel can be injected directly into the combustion chambers 16, overcoming the high pressure in the combustion chambers 16.

The number of times of injecting fuel from fuel injection valves 40 per performance of the fuel delivery of the high-pressure fuel pump 47, and the amount of fuel delivered from the high-pressure fuel pump 47 during one reciprocation of the plunger 48b are adjusted by controlling the electromagnetic spill valve 54.

The delivery of fuel from the high-pressure fuel pump 47 can be stopped by holding the electromagnetic spill valve 54 in the open state, instead of closing the electromagnetic spill valve 54, during the ejection stroke of the high-pressure fuel pump 47. During every 720° rotation of the crankshaft 14, fuel is injected from the fuel injection valves 40 four times, and the plunger 48b is reciprocated four times. The number of times of injecting fuel from fuel injection valves 40 per performance of the fuel delivery from the high-pressure fuel pump 47 can be adjusted by holding the electromagnetic spill valve 54 in the open state, instead of closing the electromagnetic spill valve 54, during a suitable number of ejection strokes during every four reciprocations of the plunger 48b.

For example, if electromagnetic spill valve 54 is closed during every ejection stroke during four reciprocations of the plunger 48b, the number of times of performing fuel injection per performance of the fuel delivery becomes one. If the electromagnetic spill valve 54 is closed during every other ejection stroke during four reciprocations of the plunger 48b, the number of times of performing fuel injection per performance of the fuel delivery becomes two. In this case, an amount of fuel that is needed for performing fuel injection twice must be delivered to the delivery pipe 53 by one performance of the fuel delivery, so that it becomes necessary to double the amount of fuel delivered per performance of the fuel delivery in comparison with the case where the number of times of performing fuel injection per performance of the fuel delivery is one.

The amount of fuel delivered to the delivery pipe 53 during one reciprocation of the plunger 48b is adjusted by adjusting the closed valve period of the electromagnetic spill valve 54 during the ejection stroke of the high-pressure fuel pump 47 through control of the timing of starting to close the electromagnetic spill valve 54. That is, if the closed valve period of the electromagnetic spill valve 54 is elongated by advancing the timing of starting to close the valve 54, the 15 amount of fuel delivered increases. If the closed valve period of the electromagnetic spill valve 54 is shortened by delaying the timing of starting to close the valve, the amount of fuel delivered decreases.

By adjusting the number of times of performing fuel injection per performance of the fuel delivery from the high-pressure fuel pump 47 and adjusting the amount of fuel delivered from the high-pressure fuel pump 47 during one reciprocation of the plunger 48b as described above, the fuel pressure in the delivery pipe 53 is controlled to a target fuel pressure that is determined in accordance with the state of operation of the engine.

The configuration of the cam lobes 22b will be described with reference to FIGS. 3A and 3B. FIG. 3A is a graph indicating changes in the height of the plunger 48b with respect to changes of the phase of the cam 22a. FIG. 3B is a graph indicating changes in the cam speed with respect to changes of the phase of the cam 22a, that is, changes in the height of the plunger 48b with respect to 1' rotation of the cam 22a.

The cam lobes 22b of the cam 22a are formed so that the height of the plunger 48b changes with respect to changes in the phase of the cam 22a as indicated in FIG. 3A. During the transition of the cam 22a from a bottom dead center 100, 140 (BDC) to a top dead center 130 (TDC) (i.e., during the ejection stroke θ) the lift of the plunger 48b gradually increases as shown by line 160. During the transition of the cam 22a from the top dead center 130 to the bottom dead center 100, 140 (i.e, during the suction stroke) the lift of the plunger 48b gradually decreases as shown by line 160.

The magnitude of the cam speed gradually increases with respect to the positive direction during a first half of the ejection stroke, and gradually decreases with respect to the positive direction during the second half of the ejection stroke as shown by line 150. Furthermore, the magnitude of the cam speed gradually increases with respect to the negative direction during a first half of the suction stroke, and gradually decreases with respect to the negative direction during the second half of the suction stroke as shown by line 150. Therefore, when the rotational position of the cam 22a is near the top dead center 130 during the ejection stroke, the magnitude of the cam speed decreases as the rotational position of the cam 22a approaches the top dead center 130.

Fuel is delivered from the high-pressure fuel pump 47 by closing the electromagnetic spill valve 54 during the ejection stroke at 120 and then opening the electromagnetic spill valve 54 when the ejection stroke ends, that is, when the top dead center 130 is reached. By operating the electromagnetic spill valve 54 in this manner, fuel is delivered from the high-pressure fuel pump 47 toward the fuel injection valves 40. The amount of fuel delivered from the high-pressure fuel pump 47 is adjusted through adjustment of the closed valve period θ of the electromagnetic spill valve 54 achieved by changing the closing timing 120 of the electromagnetic spill valve 54.

The amount of fuel delivered from the high-pressure fuel pump 47 corresponds to the area of a hatched portion 110 in FIG. 3B. The area of the hatched portion 110 changes in accordance with the closed valve period θ of the electromagnetic spill valve 54. More specifically, if the closed valve period θ of the electromagnetic spill valve 54 is elongated by advancing the timing of starting 120 to close the valve 54, the area of the hatched portion 110 increases and the amount of fuel delivered from the high-pressure fuel pump 47 increases. If the closed valve period of the electromagnetic spill valve 54 is shortened by delaying the timing of starting to close the valve 54, the area of the hatched portion 110 decreases and the amount of fuel delivered from the high-pressure fuel pump 47 decreases.

During a low-load operation of the engine, such as the idling operation or the like, during which the amount of fuel injected is reduced, the timing of starting to the close 120 the electromagnetic spill valve 54 during the ejection stroke is shifted closer to the top dead center 130, that is, the control is performed within a predetermined period close to the top dead center 130. During the predetermined period, the cam speed 150 decreases as the top dead center 130 of the cam 22a is approached. Therefore, as the timing of starting to close 120 the electromagnetic spill valve 54 is delayed, the cam speed 150 at the time of a closure of the valve decreases.

An electrical construction of a control apparatus for the high-pressure fuel pump 47 will be described with reference to FIG. 4.

The control apparatus has an electronic control unit (hereinafter, referred to as "ECU") 92 for performing controls of the operation state of the engine 11, for example, the fuel injection control, the fuel pressure control, and the like. The ECU 92 is formed as an arithmetic logic circuit having a ROM 93, a CPU 94, a RAM 95, a backup RAM 96, and the like.

The ROM 93 is a memory storing various control programs, maps that are referred to during execution of the various control programs, and the like. The CPU 94 executes various operations based on the control programs and the maps stored in the ROM 93. The RAM 95 is a memory for temporarily storing results of operations, data inputted from various sensors, and the like. The backup RAM 96 is a non-volatile memory for storing data and the like that need to be retained when the engine 11 is stopped. The ROM 93, the CPU 94, the RAM 95 and the backup RAM 96 are connected to one another and to an external input circuit 98 and an external output circuit 99, via a bus 97.

The external input circuit 98 is connected to the crank position sensor 14c, the cam position sensor 21b, the accelerator pedal position sensor 26, the vacuum sensor 36, the fuel pressure sensor 55, and the like. The external output circuit 99 is connected to the throttle motor 24, the fuel injection valves 40, the electromagnetic spill valve 54, and the like.

The ECU 92, constructed as described above, determines an engine revolution speed NE based on detection signals from the crank position sensor 14c. Furthermore, the ECU 92 determines an accelerator operation amount ACCP based on the detection signal from the accelerator pedal position sensor 26, and determines an intake pressure PM based on the detection signal from the vacuum sensor 36. During the stratified charge combustion mode, the ECU 92 calculates a basic fuel injection amount Qbse based on the engine revolution speed NE and the accelerator operation amount ACCP. During the uniform combustion mode, the ECU 92 calculates a basic fuel injection amount Qbse based on the engine revolution speed NE and the intake pressure PM.

During the stratified charge combustion mode, the ECU 92 drives and controls the fuel injection valves 40 so that an amount of fuel corresponding to a final fuel injection amount Qfin determined from the basic fuel injection amount Qbse is injected during the compression stroke of each cylinder of the engine 11. During the uniform combustion mode, the ECU 92 drives and controls the fuel injection valves 40 so that an amount of fuel corresponding to a final fuel injection amount Qfin determined from the basic fuel injection amount Qbse is injected during the intake stroke of each cylinder of the engine 11.

The amount of fuel injected from each fuel injection valve 40 is determined by the fuel pressure P in the delivery pipe 53 and the fuel injection duration. Therefore, it is preferable that the fuel pressure P determined based on the detection signal from the fuel pressure sensor 55 be kept at a target fuel pressure P0 determined in accordance with the state of operation of the engine 11. However, the fuel pressure P in the delivery pipe 53 drops every time fuel injection is performed. Therefore, it is necessary to deliver fuel from the high-pressure fuel pump 47 to the delivery pipe 53 at every predetermined crank angle (every predetermined cam angle of the cam 22a).

Normally, the ECU 92 controls the electromagnetic spill valve 54 of the high-pressure fuel pump 47 based on the detection signals from the crank position sensor 14c and the cam position sensor 21b so that fuel is delivered once for every half rotation (180° rotation) of the cam 22a, during which fuel injection is performed twice. In this case, the fuel delivery is performed by closing the electromagnetic spill valve 54 corresponding to every other cam lobe 22b of the cam 22a, instead of closing the electromagnetic spill valve 54 corresponding to every cam lobe 22b. The transition of the fuel pressure P in the delivery pipe 53 in this case will be described with reference to FIG. 6A.

Figures 6A, 6B:
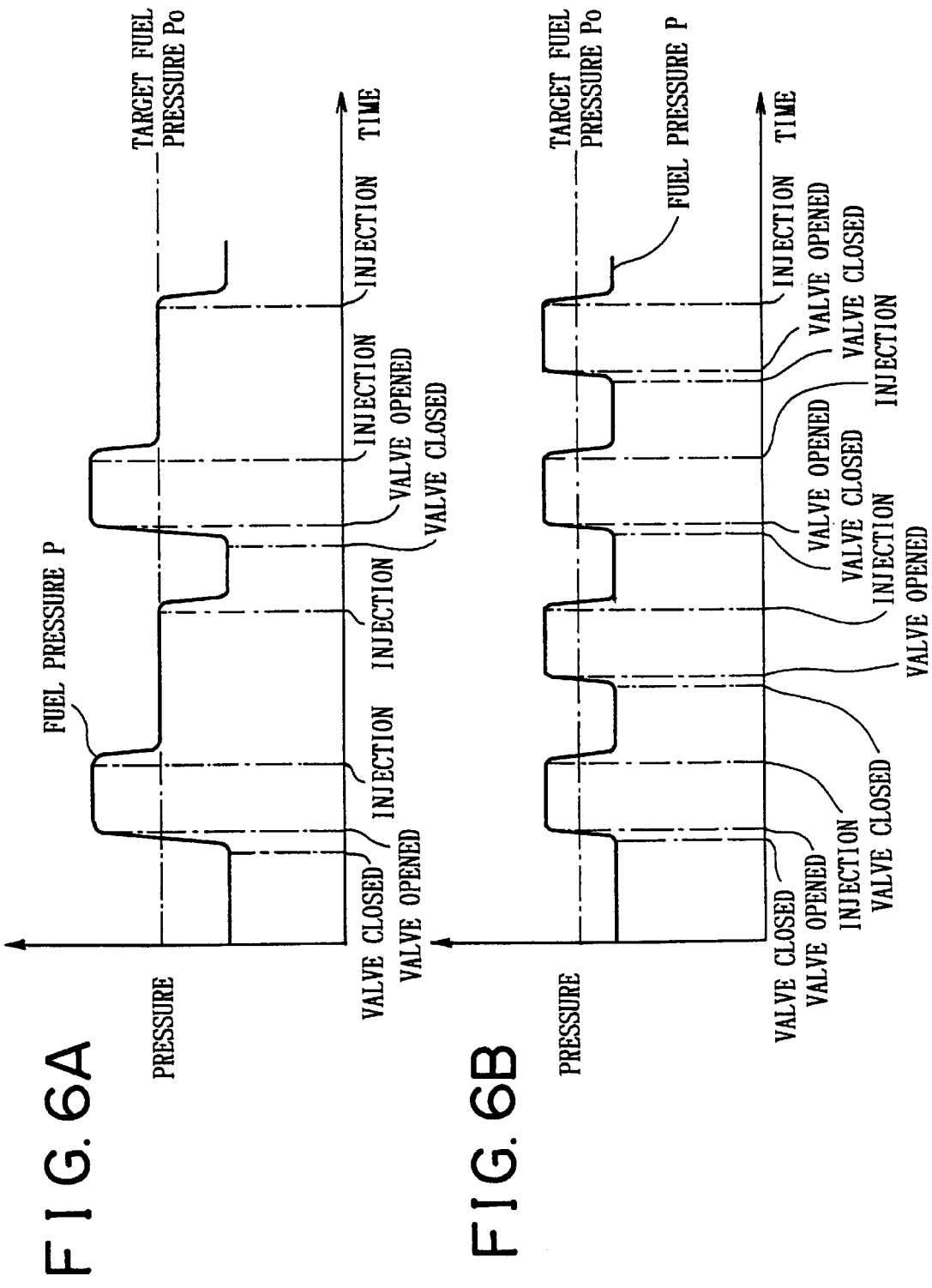
FIGS. 6A and 6B are time charts indicating changes in the fuel pressure P in a delivery pipe when fuel is delivered from the high-pressure pump and fuel is injected from fuel injection valves in the first embodiment.

As indicated in FIG. 6A, when the electromagnetic spill valve 54 starts to close, fuel is delivered from the high pressure fuel pump 47 so that the fuel pressure P in the delivery pipe 53 increases from a value below the target fuel pressure P0 toward a value above the target fuel pressure P0. Then, when the electromagnetic spill valve 54 is opened, the fuel pressure P stops increasing and holds at a constant value. After remaining at the constant value, the fuel pressure P drops stepwise every time fuel injection is performed. After fuel injection has been performed twice, the fuel pressure P drops close to the pressure occurring before the aforementioned fuel delivery.

In this case, it is necessary to sufficiently increase the fuel pressure P by delivering an amount of fuel needed for performing fuel injection twice by one performance of the fuel delivery so that the fuel pressure P does not excessively drop after the two performances of fuel injection. Therefore, the timing of starting to close the electromagnetic spill valve 54 (the closed valve period) is adjusted so as to sufficiently increase the fuel pressure P.

If fuel injection is performed twice per performance of the fuel delivery as described above, the number of times of delivering fuel during a predetermined period decreases, so that the number of times of closing the electromagnetic spill valve 54 during the predetermined period can be decreased. If the number of times of closing the electromagnetic spill valve 54 during the predetermined period excessively increases, for example, during a high-speed operation of the engine 11, it becomes difficult for the coil spring 54b to expand and contract following the increase in the number of times of opening and closing the electromagnetic spill valve 54. Even during such a state of operation of the engine 11, a reduction in the number of times of delivering fuel as described above makes it possible to secure good expansion and contraction of the coil spring 54b and cause the electromagnetic spill valve 54 to close in a precise manner.

When the electromagnetic spill valve 54 is about to be closed during the ejection stroke of the high-pressure fuel pump 47, fuel in the pressurizing chamber 49 tends to flow toward the low-pressure fuel passage 50 as well as toward the high-pressure fuel passage 52. If the electromagnetic spill valve 54 is closed in this situation, the closing movement of the electromagnetic spill valve 54 is accelerated by fuel flowing toward the low-pressure fuel passage 50, so that the impact of the closure of the electromagnetic spill valve 54 becomes considerably great. As the impact increases, the operational noise of the electromagnetic spill valve 54 (valve closure noise) increases. The operational noise of the electromagnetic spill valve 54 repeatedly occurs every time the electromagnetic spill valve 54 closes.

When the engine 11 is in, for example, a high-load and high-speed operation state, the operational noises produced by the engine 11, including the noises of combustion of air-fuel mixture in the combustion chambers 16, and the like, are loud, so that the operational noises continually produced by the electromagnetic spill valve 54 are not so relatively loud as to annoy an occupant in the vehicle or the like. However, during a low-load operation of the engine 11, such as the idling operation or the like, the operational noises of the engine 11 become low, so that the operational noises continually produced by the electromagnetic spill valve 54 become relatively loud, and annoy an occupant in the vehicle or the like to an unignorable level.

In this embodiment, therefore, during the low-load operation of the engine 11, such as the idling operation or the like, the number of times of injecting fuel per performance of the fuel delivery from the high-pressure fuel pump 47 is decreased by adjusting the number of times of performing the fuel delivery per rotation of the cam 22a. For example, the number of times of injecting fuel per performance of the fuel delivery from the high-pressure fuel pump 47 is decreased to one. The transition of the fuel pressure P in the delivery pipe 53 in this case will be described with reference to FIG. 6B.

As indicated in FIG. 6B, when the electromagnetic spill valve 54 starts to close, fuel is delivered from the high-pressure fuel pump 47 so that the fuel pressure P in the delivery pipe 53 rises from a value below the target fuel pressure P0 toward a value above the target fuel pressure P0. Then, when the electromagnetic spill valve 54 is opened, the fuel pressure P stops rising and holds at a constant value. After fuel injection is performed once, the fuel pressure P drops close to a pre s sure occurring before the aforementioned fuel delivery. After that, fuel is delivered again so that the fuel pressure P rises to the value above the target fuel pressure P0.

Since the amount of fuel needed for performing fuel injection once is delivered by one performance of the fuel delivery in this case, it is unnecessary to increase the fuel pressure P to such a high level as in the aforementioned case where fuel injection is performed twice per performance of the fuel delivery. Therefore, when the electromagnetic spill valve 54 is to be closed in order to increase the fuel pressure P, the timing of starting to close the valve can be set to a later timing and the closed valve period can be set to a shorter period in the case where fuel injection is performed once per performance of the fuel delivery than in the case where fuel injection is performed twice per performance of the fuel delivery.

If the timing of starting to close the electromagnetic spill valve 54 is delayed as described above, the cam speed at the time of starting to close the electromagnetic spill valve 54 is reduced, so that the force applied from fuel to the electromagnetic spill valve 54 in the valve closing direction during the closing movement of the valve decreases. Therefore, the operational noises continually produced by the electromagnetic spill valve 54 corresponding to continual closures of the electromagnetic spill valve 54 (i.e., valve closure noises) are reduced. Hence, during the low-load operation of the engine 11, during which the operational noises of the engine 11 are low, annoyance to an occupant in the vehicle or the like caused by the continual operational noises of the electromagnetic spill valve 54 is substantially avoided.

A procedure of controlling the electromagnetic spill valve 54 will be described. Based on the fuel pressure P, the target fuel pressure P0, the final fuel injection amount Qfin, the engine revolution speed NE and the like, the ECU 92 calculates a duty ratio, DT for controlling the timing of starting to close the electromagnetic spill valve 54. The duty ratio DT indicates the proportion of a cam angle θ in which the electromagnetic spill valve 54 is closed to a predetermined cam angle of the cam 22a, for example, a cam angle θ0 corresponding to the ejection stroke of the high-pressure fuel pump 47, that is, θ/θ0. The relationship between the cam angle θ and the cam angle θ0 is indicated in FIG. 3A.

As is apparent from FIG. 3A, the closing movement of the electromagnetic spill valve 54 ends at a timing at which the position of the cam 22a reaches the top dead center 130. That is, as the duty ratio DT is increased, the timing of starting to close the electromagnetic spill valve 54 as shown by broken line 120 advances, and the amount of fuel delivered from the high-pressure fuel pump 47 to the delivery pipe 53 (indicated by the area of the hatched portion in 110 FIG. 3B) increases.

The duty ratio DT is calculated as in equation (1).

$$DT=DTp+DTi+FF \quad (1)$$

where DTp=proportional term
DTi=integral term
FF=feed forward term

In equation (1), the proportional term DTp is provided for bringing the fuel pressure P closer to the target fuel pressure P0, and the integral term DTi is provided for reducing the variation of the duty ratio DT caused by fuel leakage or the like. The proportional term DTp and the integral term DTi are calculated as in equations (2) and (3), respectively.

$$DTP=K1*(P0-P) \quad (2)$$

$$DTi=DTi+K2*(P0-P) \quad (3)$$

where K1, K2 are coefficients.

In equation (1), the feed forward term FF is provided for supplying an amount of fuel needed at the predetermined crank angle beforehand so that even during transitional state of the engine 11 or the like, the fuel pressure P can be quickly brought close to the target fuel pressure P0. The feed forward term FF is determined based on the final fuel injection amount Qfin and the engine revolution speed NE with reference to a map. The thus-determined feed forward term FF increases with increases in the final fuel injection amount of Qfin, and also increases with increases in the engine revolution speed NE.

Based on the duty ratio DT calculated as in equation (1), the ECU 92 controls the timing of starting to electrify the electromagnetic solenoid 54a, that is, the timing of starting to close the electromagnetic spill valve 54. Relationships of the timing of starting to close the electromagnetic spill valve 54 with the final fuel injection amount Qfin and the engine revolution speed NE are indicated in FIG. 5.

Figure 5:
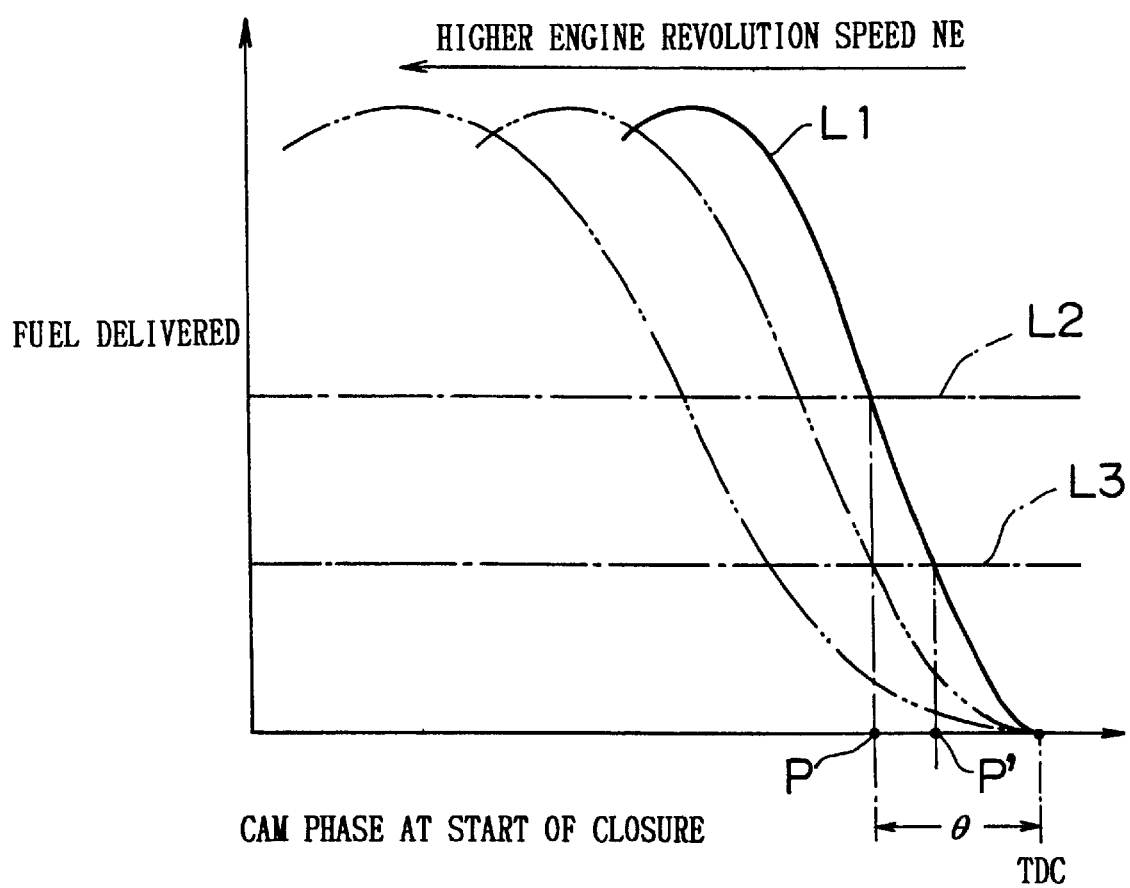
FIG. 5 is a graph indicating a relationship among the amount of fuel delivered (i.e., final fuel injection amount Qfin), the engine revolution speed NE, and the timing of starting to close an electromagnetic spill valve.

In FIG. 5, a solid line L1 indicates changes in the amount of fuel delivered from the high-pressure fuel pump 47 (the amount of fuel delivered per ejection stroke) in accordance with changes in the timing of starting to close the electromagnetic spill valve 54 under a condition that the engine revolution speed NE is constant. A one-dot chain line L2 indicates the amount of fuel that needs to be delivered by one performance of the fuel delivery in order to inject from a fuel injection valve 40 an amount of fuel corresponding to the final fuel injection amount Qfin.

The solid line L1 shifts to the left in FIG. 5 as indicated by two-dot chain lines L4 and L5, as the engine revolution speed NE increases. The one-dot chain line shifts upward in FIG. 5 as the final fuel injection amount Qfin increases. The timing of starting to close the electromagnetic spill valve 54 is indicated by the intersection between the solid line L1 and the one-dot chain line; more specifically, the timing is indicated by point p in FIG. 5. Therefore, the timing of starting to close the electromagnetic spill valve 54 is advanced with increases in the final fuel injection amount Qfin and with increases in the engine revolution speed NE.

The timing of starting to close the electromagnetic spill valve 54 needs to be changed in accordance with the number of times of injecting fuel per performance of the fuel delivery from the high-pressure fuel pump 47, because the amount of fuel that needs to be delivered by one performance of the fuel delivery changes in accordance with the number of times of injecting fuel per performance of the fuel delivery. If the number of times of injecting fuel per performance of the fuel delivery is changed from two to one, the amount of fuel that needs to be delivered by one performance of the fuel delivery is halved. Therefore, in the case where fuel injection is performed once per performance of the fuel delivery, the timing of starting to close the electromagnetic spill valve 54 is delayed so that the closed valve period is approximately halved, in comparison with the case where fuel injection is performed twice per performance of the fuel delivery.

Under conditions that the engine revolution speed NE and the final fuel injection amount Qfin are kept at values corresponding to the solid line L1 and the one-dot chain line L2 in FIG. 5, respectively, and that fuel injection is performed twice per performance of the fuel delivery, the timing of starting to close the electromagnetic spill valve 54 is set to the timing indicated by point p in FIG. 5. If the operation of the engine 11 changes from the state of operation determined by these conditions to a low-load operation (e.g., the idling operation in this embodiment), the ECU 92 changes the number of times of injecting fuel per performance of the fuel delivery from two to one by controlling the electromagnetic spill valve 54.

When the number of times of injecting fuel per performance of the fuel delivery is changed to one, the amount of fuel that needs to be delivered by one performance of the fuel delivery is reduced as indicated by a one-dot chain line L3 in FIG. 5. In accordance with the change in the number of times of injecting fuel per performance of the fuel delivery, the ECU 92 delays the timing of starting to close the electromagnetic spill valve 54 from the timing indicated by point p to a timing indicated by point p' in FIG. 5. After this change (delay) of the timing of starting to close the electromagnetic spill valve 54, the cam speed at the time of a closure of the electromagnetic spill valve 54 becomes lower. As a result, the force applied from fuel to the electromagnetic spill valve 54 in the valve closing direction decreases, and the impact of the electromagnetic spill valve 54 at the time of its closure decreases. Therefore, the operational noise of the electromagnetic spill valve 54 (valve closure noise) is reduced.

The above-described change of the timing of starting to close the electromagnetic spill valve 54 is accomplished by changing the feed forward term FF used in the calculation of the duty ratio DT in accordance with the number of times of injecting fuel per performance of the fuel delivery. More specifically, two kinds of maps that accord with the case of two performances of fuel injection per performance of the fuel delivery and the case of one performance of fuel injection per performance of the fuel delivery are prepared as maps for use in the calculation of the duty ratio DT. Then, the ECU 92 selects one of the two kinds of maps as a map to be used for determining the feed forward term FF, based on whether the engine 11 is in the idling state.

By referring to the selected map, the ECU 92 determines a feed forward term FF. The feed forward term FF determined from the map for the case of one performance of fuel injection per performance of the fuel delivery is less than the feed forward term FF determined from the map for the case of two performances of fuel injection per performance of the fuel delivery. Therefore, the duty ratio DT determined for the case of one performance of fuel injection per performance of the fuel delivery becomes smaller than the duty ratio DT determined for the case of two performances of fuel injection per performance of the fuel delivery.

Based on the duty ratio DT calculated as described above, the ECU 92 controls the timing of starting to close the electromagnetic spill valve 54. During the idling operation, during which fuel injection is performed once per performance of the fuel delivery, the duty ratio DT is less than that determined for the case of two performances of fuel injection per performance of the fuel delivery, so that the timing of starting to close the electromagnetic spill valve 54 is delayed (i.e., shifted toward the top dead center 130). Since the timing of starting to close the electromagnetic spill valve 54 is delayed in this manner during the idling state or the like, the cam speed at the time of a closure of the electromagnetic spill valve 54 becomes lower and, therefore, the operational noises of the electromagnetic spill valve 54 (valve closure noises) are reduced.

A procedure of determining a feed forward term FF will be described with reference to FIG. 7. FIG. 7 is a flowchart illustrating a feed forward term determining routine for determining a feed forward term FF. The feed forward term determining routine is executed by the ECU 92, for example, as time interrupts occurring at predetermined time intervals.

In the feed forward term determining routine, the ECU 92 determines in step S101 whether the engine 11 is in the idling state, based on whether the basic fuel injection amount Qbse and the engine revolution speed NE are within a region (low-speed and low-load region) corresponding to the idling state. During the idling state of the engine 11, fuel injection is performed once per performance of the fuel delivery from the high-pressure fuel pump 47. When the engine 11 is not in the idling state, fuel injection is performed twice per performance of the fuel delivery.

If it is determined in step S101 that the engine 11 is in the idling state, the process proceeds to step S102, in which the ECU 92 selects a map corresponding to the case where fuel injection is performed once per performance of the fuel delivery as a map to be used for determining a feed forward term FF. Conversely, if it is determined in step S101 that the engine 11 not in the idling state, the process proceeds to step S103, in which the ECU 92 selects a map corresponding to the case where fuel injection is performed twice per performance of the fuel delivery as a map to be used for determining a feed forward term.

In step S104 following either step S102 or step S103, the ECU 92 determines a feed forward term FF based on the final fuel injection amount Qfin and the engine revolution speed NE with reference to the selected map. The thus-determined feed forward term FF increases with increases in the final fuel injection amount Qfin and with increases in the engine revolution speed NE. When the final fuel injection amount Qfin and the engine revolution speed NE are constant, the feed forward term FF determined from the map corresponding to the case where fuel injection is performed once per performance of the fuel delivery is less than the feed forward term FF determined from the map corresponding to the case where fuel injection is performed twice per performance of the fuel delivery.

After determining the feed forward term FF in this manner, the ECU 92 temporarily ends the feed forward term determining routine. Then, the ECU 92 determines a duty ratio DT based on the feed forward term FF determined in the routine, etc. Thus, during the idling state, the feed forward term FF is provided with a reduced value, and therefore the duty ratio DT is provided with a reduced value. Based on the reduced duty ratio DT, the timing of starting to close the electromagnetic spill valve 54 is controlled. During the idling state, therefore, the timing of starting to close the electromagnetic spill valve 54 is delayed to a timing closer to the top dead center 130, so that the cam speed of the cam 22a at the valve closing timing becomes lower. As a result, the operational noises of the electromagnetic spill valve 54 (valve closure noises) are reduced.

This embodiment, performing the operations as described above, achieves the following advantages. During the low-load operation of the engine (during the idling operation in this embodiment), the number of times of performing fuel injection per performance of the fuel delivery from the high-pressure fuel pump 47 is decreased, that is, fuel injection is performed once per performance of the fuel delivery. By adjusting the number of times of performing fuel injection per performance of the fuel delivery in this manner, the amount of fuel delivered by one performance of the fuel delivery to provide a needed fuel injection amount can be reduced. To reduce the amount of fuel delivered by one performance of the fuel delivery, the timing of starting to close the electromagnetic spill valve 54 is changed to a delayed timing (toward the top dead center) within a predetermined period during which the position of the cam 22a is close to the top dead center during the ejection stroke of the high-pressure fuel pump 47, that is, within a predetermined period during which the cam speed is relatively low, so that the closed valve period of the electromagnetic spill valve 54 is reduced. By delaying the timing of starting to close the electromagnetic spill valve 54 in this manner, the cam speed occurring at the time of a closure of the electromagnetic spill valve 54 is reduced, so that the force applied from fuel to the electromagnetic spill valve 54 in the valve closing direction during the closing movement of the valve is reduced. Therefore, during the idling operation of the engine 11, during which the operational noises of the engine 11 become low, the noise produced by a closure of the electromagnetic spill valve 54 is reduced, so that the operational noises continually occurring corresponding to continual closures of the electromagnetic spill valve 54 are reduced.

SECOND EMBODIMENT

Figure 8:
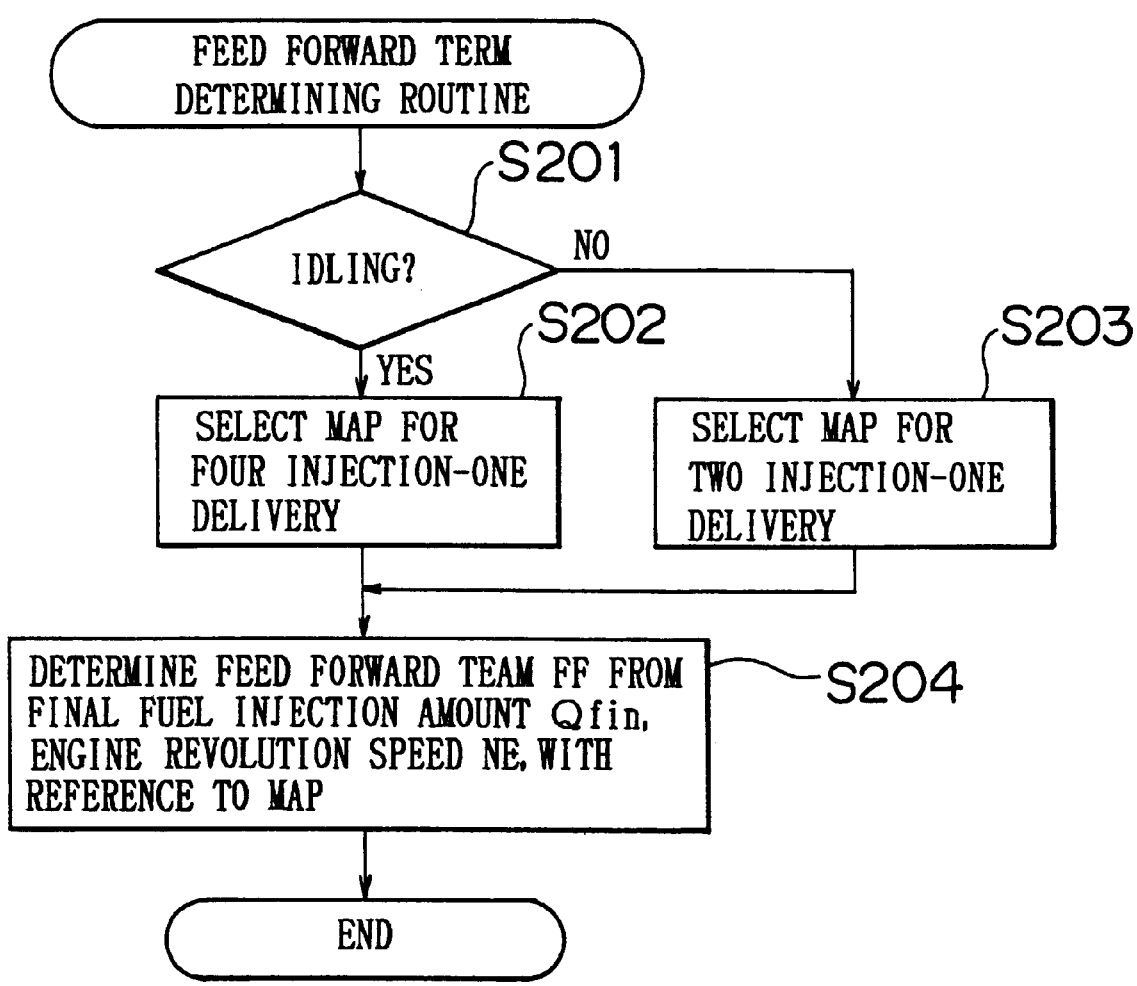
FIG. 8 is a flowchart illustrating a procedure of determining a feed forward term in a second embodiment.
Figure 10:
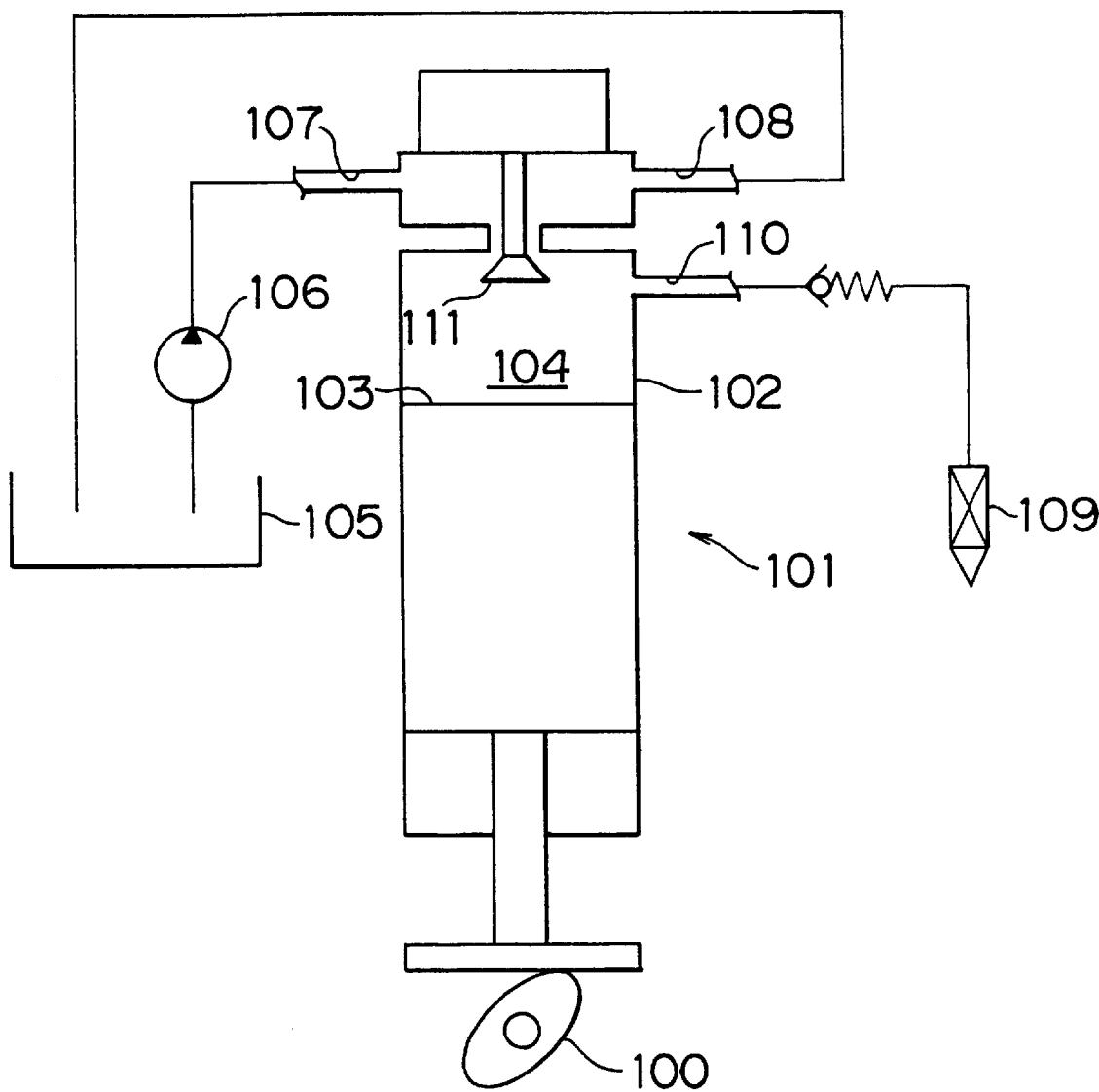
FIG. 10 is a schematic illustration of a conventional high-pressure fuel pump.

A second exemplary embodiment of the invention will be described with reference to FIGS. 8 and 9. During a low-load operation of the engine (e.g., an idling operation), this embodiment increases the number of times of injecting fuel per performance of the fuel delivery so that fuel injection is performed four times per performance of the fuel delivery. In this case, since the amount of fuel delivered by a performance of the fuel delivery needs to be increased, the timing of starting to close the electromagnetic spill valve 54 is controlled to an advanced timing (i.e., a timing apart from the top dead center 130), at which the cam speed is higher. Therefore, the noise produced by a closure of the electromagnetic spill valve 54 increases. However, since the number of times of delivering fuel during a predetermined period, that is, the number of times of closing the electromagnetic spill valve 54 during a predetermined period, decreases, there is a good reduction in the noise level in terms of the operational noises continually occurring corresponding to continual closures of the electromagnetic spill valve 54. Thus, this embodiment differs from the first embodiment in the manner of changing the number of times of injecting fuel per performance of the fuel delivery. In the description below, features and portions that distinguish the second embodiment from the first embodiment will mainly be described, and features and portions of the second embodiment substantially the same as those of the first embodiment will not be described.

In this embodiment, too, the ECU 92 calculates a basic fuel injection amount Qbse based on the engine revolution speed NE and the accelerator operation amount ACCP or the intake pressure PM, and causes each fuel injection valve 40 to inject an amount of fuel corresponding to a final fuel injection amount Qf in determined from the basic fuel injection amount Qbse, into the corresponding combustion chamber 16. In order to perform proper fuel injection, it is preferred to keep the fuel pressure P in the delivery pipe 53 at a target fuel pressure P0. Since the fuel pressure P drops every time fuel injection is performed, fuel is delivered from the high-pressure fuel pump 47 to the delivery pipe 53 at every pre determined crank angle (every predetermined cam angle of the cam 22a).

Normally, the ECU 92 controls the electromagnetic spill valve 54 of the high-pressure fuel pump 47 so that the fuel delivery is performed once during every half rotation (180° rotation) of the cam 22a, during which fuel injection is performed twice. Changes in the fuel pressure P in the delivery pipe 53 occurring in this case will be described with reference to FIG. 9A.

As indicated in FIG. 9A, when the electromagnetic spill valve 54 starts to close, fuel is delivered from the high pressure fuel pump 47 so that the fuel pressure P in the delivery 5 pipe 53 increases from a value below the target fuel pressure P0 toward a value above the target fuel pressure P0. Then, when the electromagnetic spill valve 54 is opened, the fuel pressure P stops increasing and holds at a constant value. After remaining at the constant value, the fuel pressure P drops stepwise every time fuel injection is performed. After fuel injection has been performed twice, the fuel pressure P drops close to the pressure occurring before the aforementioned fuel delivery.

In this case, it is necessary to sufficiently increase the fuel pressure P by delivering an amount of fuel needed for performing fuel injection twice by one performance of the fuel delivery so that the fuel pressure P does not excessively drop after the two performances of fuel injection. Therefore, the timing of starting to close the electromagnetic spill valve 54 (the closed valve period) is adjusted so as to sufficiently increase the fuel pressure P.

If fuel injection is performed twice per performance of the fuel delivery as described above, the amount of fuel that needs to be delivered by one performance of the fuel delivery in order to perform fuel injection twice does not excessively increase when a large amount of fuel needs to be injected, for example, during a high-load operation of the engine 11. Therefore, it is possible to substantially prevent the required fuel delivery amount from exceeding the limit of the amount of fuel that can actually be delivered, that is, substantially prevent a failure in delivering a needed, amount of fuel.

During the low-load operation of the engine 11, such as the idling operation or the like, the operational noises of the engine 11 are low. Therefore, the operational noises continually occurring corresponding to continual closures of the electromagnetic spill valve 54 become relatively loud, so that the annoyance to an occupant or the like caused by the continual operational noises increases to a level that cannot be ignored.

In this embodiment, therefore, when the load on the engine 11 is low, for example, during the idling operation or the like, the number of times of delivering fuel from the high-pressure fuel pump 47 per rotation of the cam 22a is adjusted to increase the number of times of injecting fuel from fuel injection valves 40 per performance of the fuel delivery. For example, the number of times of delivering fuel from the high-pressure fuel pump 47 per rotation of the cam 22a is adjusted so that fuel is injected from the fuel injection valve 40 four times per performance of the fuel delivery. The transition of the fuel pressure P in the delivery pipe 53 in this case will be described with reference to FIG. 9B.

As indicated in FIG. 9B, when the electromagnetic spill valve 54 starts to close, fuel is delivered from the high-pressure fuel pump 47 so that the fuel pressure P in the delivery pipe 53 increases from a value below the target fuel pressure P0 toward a value above the target fuel pressure P0. Then, when the electromagnetic spill valve 54 is opened, the fuel pressure P stops increasing and holds at a constant value.

After remaining at the constant value, the fuel pressure P drops stepwise every time fuel injection is performed. After fuel injection has been performed four times, the fuel pressure P drops close to the pressure occurring before the aforementioned fuel delivery.

In this case, it is necessary to sufficiently increase the fuel pressure P by delivering an amount of fuel needed for performing fuel injection four times by one performance of the fuel delivery so that the fuel pressure P does not excessively drop after the four performances of fuel injection. In order to sufficiently increase the fuel pressure P, the timing of starting to close the electromagnetic spill valve 54 is advanced and the closed period of the valve 54 is elongated.

If the timing of starting to close the electromagnetic spill valve 54 is advanced as described above, the cam speed occurring at the time of the closure of the valve 54 increases, so that the force applied from fuel to the electromagnetic spill valve 54 in the valve closing direction during the closing movement of the valve 54 increases. Therefore, the noise produced by a closure of the electromagnetic spill valve 54 increases. However, since the number of times of injecting fuel per performance of the fuel delivery is changed to four, the number of times of delivering fuel during a predetermined period, that is, the number of occurrences of noises caused by closures of the electromagnetic spill valve 54 during a predetermined period, is reduced. Therefore, the noise level in terms of the operational noises continually occurring corresponding to continual closures of the electromagnetic spill valve 54 (valve closure noises) is reduced. Hence, during the low-load operation of the engine 11, during which the operational noises of the engine 11 are relatively low, annoyance to an occupant or the like caused by the continual operational noises of the electromagnetic spill valve 54 can be substantially prevented. A procedure of controlling the electromagnetic spill valve 54 will be described below.

The ECU 92 calculates a duty ratio DT for controlling the timing of starting to close the electromagnetic spill valve 54, based on the fuel pressure P, the target fuel pressure P0, the final fuel injection amount Qfin, the engine revolution speed NE and the like, as in equations (1) to (3). The feed forward term FF in equation (1) is determined based on the final fuel injection amount Qfin and the engine revolution speed NE with reference to a map. As for the map used for determining the feed forward term FF, two kinds of maps that accord with the case of two performances of fuel injection per performance of the fuel delivery and the case of four performances of fuel injection per performance of the fuel delivery are prepared. The ECU 92 selects one of the two kinds of maps as a map to be used for determining a feed forward term FF, based on whether the engine 11 in the idling state.

That is, when the engine 11 is in the idling state, the ECU 92 selects the map corresponding to the case of four performances of fuel injection per performance of the fuel delivery. When the engine 11 is not in the idling state, the ECU 92 selects the map corresponding to the case of two performances of fuel injection per performance of the fuel delivery. By referring to the map selected in this manner, the ECU 92 determines a feed forward term FF.

The feed forward term FF determined from the map corresponding to the case of four performances of fuel injection per performance of the fuel delivery is greater than the feed forward term FF determined from the map corresponding to the case of two performances of fuel injection per performance of the fuel delivery. Therefore, the duty ratio DT determined for the case of four performances of fuel injection per performance of the fuel delivery is greater than the duty ratio DT determined for the case of two performances of fuel injection per performance of the fuel delivery.

Based on the duty ratio DT calculated in this manner, the ECU 92 controls the timing of starting to close the electromagnetic spill valve 54. The purpose of determining a greater feed forward term FF for the case of four performances of fuel injection per performance of the fuel delivery is to advance the timing of starting to close the electromagnetic spill valve 54 and therefore elongate the closed period of the valve 54 so as to deliver an amount of fuel needed for four performances of fuel injection to the delivery pipe 53 by one performance of the fuel delivery.

During the idling operation, during which fuel injection is performed four times per performance of the fuel delivery, the duty ratio DT is greater than the duty ratio DT determined for the case of two performances of fuel injection per performance of the fuel delivery, so that the timing of starting to close the electromagnetic spill valve 54 is set to an advanced timing (i.e., a timing apart from the top dead center 130). By advancing the timing of starting to close the electromagnetic spill valve 54 in this manner, the cam speed occurring at the time of the closure of the electromagnetic spill valve 54 increases and, therefore, the noise produced by the closure of the electromagnetic spill valve 54 increases. However, since the number of times of performing fuel injection per performance of the fuel delivery is set to four, the number of times of performing the fuel delivery during a predetermined period, that is, the number of occurrences of noises caused by closures of the electromagnetic spill valve 54 during a predetermined period, decreases. Therefore, the noise level in terms of the operational noises continually occurring corresponding to continual closures of the electromagnetic spill valve 54 (valve closure noises) is reduced.

A procedure of determining a feed forward term FF will be described with reference to FIG. 8. FIG. 8 is a flowchart illustrating a feed forward term determining routine for determining a feed forward term FF. The feed forward term determining routine is executed by the ECU 92, for example, as time interrupts occurring at predetermined time intervals. The feed forward term determining routine illustrated in FIG. 8 differs from the feed forward term determining routine (FIG. 7) of the first embodiment only in a processing (step S202) corresponding to step S102 in FIG. 7.

In the feed forward term determining routine of this embodiment, the ECU 92 determines in step S201 whether the engine 11 is in the idling state. During the idling state of the engine 11, fuel injection is performed four times per performance of the fuel delivery from the high-pressure fuel pump 47. When the engine 11 is not in the idling state, fuel injection is performed twice per performance of the fuel delivery.

If it is determined in step S201 that the engine 11 is in the idling state, the process proceeds to step S202, in which the ECU 92 selects a map corresponding to the case where fuel injection is performed four times per performance of the fuel delivery as a map to be used for determining a feed forward term FF. Conversely, if it is determined in step S201 that the engine 11 not in the idling state, the process proceeds to step S203, in which the ECU 92 selects a map corresponding to the case where fuel injection is performed twice per performance of the fuel delivery as a map to be used for determining a feed forward term FF.

In step S204 following either step S202 or step S203, the ECU 92 determines a feed forward term FF with reference to the selected map. When the final fuel injection amount Qfin and the engine revolution speed NE are constant, the feed forward term FF determined from the map corresponding to the case where fuel injection is performed four times per performance of the fuel delivery is greater than the feed forward term FF determined from the map corresponding to the case where fuel injection is performed twice per performance of the fuel delivery.

After determining the feed forward term FF in this manner, the ECU 92 temporarily ends the feed forward term determining routine. Then, the ECU 92 determines a duty ratio DT based on the feed forward term FF determined in the routine, etc. Thus, during the idling state, the feed forward term FF is provided with an increased value, and therefore the duty ratio DT is provided with an increased value. Based on the increased duty ratio DT, the timing of starting to close the electromagnetic spill valve 54 is controlled. During the idling state, therefore, the timing of starting to close the electromagnetic spill valve 54 is advanced to a timing apart from the top dead center, at which timing the cam speed of the cam 22a becomes higher. As a result, the operational noise of the electromagnetic spill valve 54 (valve closure noise) increases. However, since the number of times of performing fuel injection per performance of the fuel delivery is changed to four, the number of times of performing the fuel delivery during a predetermined period, that is, the number of occurrences of noises caused by closures of the electromagnetic spill valve 54 during a predetermined period, decreases. Therefore, the noise level in terms of the operational noises continually occurring corresponding to continual closures of the electromagnetic spill valve 54 (valve closure noises) is reduced.

This embodiment, performing the above-described operations, achieves the following advantages.

During the low-load operation of the engine (during the idling operation in this embodiment), the number of times of performing fuel injection per performance of the fuel delivery from the high-pressure fuel pump 47 is increased, that is, fuel injection is performed four times per performance of the fuel delivery. By adjusting the number of times of performing fuel injection per performance of the fuel delivery in this manner, the amount of fuel delivered by one performance of the fuel delivery to provide a needed fuel injection amount is increased. To increase the amount of fuel delivered by one performance of the fuel delivery, the timing of starting to close the electromagnetic spill valve 54 is changed to an advanced timing (a timing apart from the top dead center) within a predetermined period during which the position of the cam 22a is close to the top dead center during the ejection stroke of the high-pressure fuel pump 47, that is, within a predetermined period during which the cam speed is relatively low. Since the timing of starting to close the electromagnetic spill valve 54 is advanced in this manner, the noise produced by a closure of the electromagnetic spill valve 54 increases. However, since the number of times of performing fuel injection per performance of the fuel delivery is changed to four, the number of times of performing the fuel delivery during a predetermined period, that is, the number of occurrences of noises caused by closures of the electromagnetic spill valve 54 during a predetermined period, decreases. Therefore, the noise level in terms of the operational noises continually occurring corresponding to continual closures of the electromagnetic spill valve 54 (valve closure noises) is reduced.

The foregoing embodiments may be modified in various manners, for example, in the following manners.

Although in the foregoing embodiment, the number of times of performing fuel injection per performance of the fuel delivery is changed based on whether the engine 11 is in the idling state, the criterion for making this change is not limited to the determination as to whether the engine 11 is in the idling state. For example, the aforementioned change may be made based on whether the engine 11 is in a predetermined low-load operation state including the idling state.

Furthermore, although in the foregoing embodiments, the high-pressure fuel pump 47 is driven by the cam 22a provided with the four cam lobes 22b, the number of cam lobes 22b of the cam 22a is not limited to four, but may be any suitable number. For example, if the cam 22a has more than four cam lobes, the number of times of performing the fuel delivery during a predetermined period can be more finely adjusted, and the range of change in the number of times of performing fuel injection per performance of the fuel delivery can be broadened.

In the second embodiment, the number of times of performing fuel injection per performance of the fuel delivery is increased to four during the idling state. However, the increased number of performing fuel injection per performance of the fuel delivery is not necessarily four, but may also be, for example, three, or more than four.

In the first embodiment, the number of times of performing fuel injection per performance of the fuel delivery is decreased to one during the idling state. However, if the cam 22a has more than four cam lobes 22b and the number of times of performing fuel injection per performance of the fuel delivery during the normal operation of the engine 11 is set to more than two, the decreased number of times of performing fuel injection per performance of the fuel delivery may be set to a number other than one (e.g., two). In this case, too, the operational noises continually occurring corresponding to continual closures of the electromagnetic spill valve 54 can be reduced.

Although in the foregoing embodiments, the invention is applied to the high-pressure fuel pump 47 adopted in a direct injection gasoline engine wherein fuel is directly injected into the combustion chambers 16, the invention is also applicable to other types of fuel pumps, for example, a fuel pump adopted in a direct injection type diesel engine, or the like.

While the invention has been described with reference to preferred embodiments thereof, it is to be understood that the invention is not limited to the disclosed embodiments or constructions. On the contrary, the invention is intended to cover various modifications and equivalent arrangements. In addition, while the various elements of the invention are shown in various combinations and configurations, which are exemplary, other combinations and configurations, including more, less or only a single embodiment, are also within the spirit and scope of the invention.

What is claimed is:

1. A fuel pump control apparatus for controlling a fuel pump that draws fuel into a pressurizing chamber by changing a capacity of the pressurizing chamber based on a relative movement between a plunger and a cylinder caused by a rotation of a cam and that delivers fuel toward a fuel injection valve of an internal combustion engine, the fuel pump including a spill valve that opens and closes a communication between the pressurizing chamber and a spill passage that leads fuel out of the pressurizing chamber, the fuel pump control apparatus adjusts an amount of fuel delivered from the fuel pump toward the fuel injection valve by controlling a closed valve period of the spill valve, the fuel pump control apparatus comprising:

a controller that adjusts a number of times of performing fuel delivery from the fuel pump during a predetermined period to change a number of times of injecting fuel from the fuel injection valve per performance of the fuel delivery, by controlling the spill valve based on a load of the internal combustion engine.

2. A fuel pump control apparatus according to claim 1, wherein the controller decreases the number of times of injecting fuel per performance of the fuel delivery during a low-load operation of the internal combustion engine.

3. A fuel pump control apparatus according to claim 2, where the controller decreases the number of times of injecting fuel per performance of the fuel delivery, at least when the internal combustion engine is in an idling state.

4. A fuel pump control apparatus according to claim 1, wherein the controller sets the number of times of injecting fuel per performance of the fuel delivery to one during a low-load operation of the internal combustion engine.

5. A fuel pump control apparatus according to claim 4, where the controller sets the number of times of injecting fuel per performance of the fuel delivery to one, at least when the internal combustion engine is in an idling state.

6. A fuel pump control apparatus according to claim 1, wherein the controller increases the number of times of injecting fuel per performance of the fuel delivery during a low-load operation of the internal combustion engine.

7. A fuel pump control apparatus according to claim 6, where the controller increases the number of times of injecting fuel per performance of the fuel delivery, at least when the internal combustion engine is in an idling state.

8. A method of injecting fuel into a fuel injection valve of an internal combustion engine using a fuel pump that draws fuel into a pressurizing chamber based on a changing capacity of the pressurizing chamber based on a relative movement between a plunger and a cylinder caused by a rotation of a cam and that delivers fuel toward a fuel injection valve of an internal combustion engine, and by using a spill valve that opens and closes a communication between the pressurizing chamber and a spill passage that leads fuel out of the pressurizing chamber, wherein the method of injecting fuel adjusts an amount of fuel delivered toward the fuel injection valve by controlling the closed valve period of the spill valve, comprising the step of:

controlling the number of times of performing fuel delivery based on a load of the engine.

9. A method according to claim 8, wherein the controlling step controls the number of times of injecting to either increase or decrease the number of times of fuel delivery based on the load of the engine.

10. A method according to claim 8, wherein the controlling step decreases the number of times of performing fuel delivery when the internal combustion engine is idling.

11. A method according to claim 8, wherein the controlling step sets the number of times of performing fuel delivery to one when the internal combustion engine is idling.

12. A method according to claim 8, wherein the controlling step increases the number of times of performing fuel delivery when the engine is a low-load operating state.

13. A fuel pump control apparatus for controlling a fuel pump that draws fuel into a pressurizing chamber by changing a capacity of the pressurizing chamber based on a relative movement between a plunger and a cylinder caused by a rotation of a cam and that delivers fuel toward a fuel injection valve of an internal combustion engine, the fuel pump including a spill valve that opens and closes a communication between the pressurizing chamber and a spill passage that leads fuel out of the pressurizing chamber, the fuel pump control apparatus adjusts an amount of fuel delivered from the fuel pump toward the fuel injection valve by controlling a closed valve period of the spill valve, the fuel pump control apparatus comprising:

control means for adjusting a number of times of performing fuel delivery from the fuel pump during a predetermined period to change a number of times of injecting fuel from the fuel injection valve per performance of the fuel delivery, by controlling the spill valve based on a load of the internal combustion engine.

* * * * *